US009718996B2

(12) United States Patent
Kurimura et al.

(10) Patent No.: US 9,718,996 B2
(45) Date of Patent: Aug. 1, 2017

(54) COMPOSITION AND METHOD FOR TEMPORARILY FIXING MEMBER USING SAME

(75) Inventors: Hiroyuki Kurimura, Shibukawa (JP); Kenji Tanaka, Shibukawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 353 days.

(21) Appl. No.: 14/344,869

(22) PCT Filed: Sep. 14, 2012

(86) PCT No.: PCT/JP2012/073707
§ 371 (c)(1),
(2), (4) Date: Apr. 7, 2014

(87) PCT Pub. No.: WO2013/039226
PCT Pub. Date: Mar. 21, 2013

(65) Prior Publication Data
US 2015/0044490 A1    Feb. 12, 2015

(30) Foreign Application Priority Data
Sep. 14, 2011 (JP) .................. 2011-201198

(51) Int. Cl.
| C09J 133/14 | (2006.01) |
|---|---|
| C08F 2/44 | (2006.01) |
| C08F 220/18 | (2006.01) |
| C08F 220/20 | (2006.01) |
| C09J 5/00 | (2006.01) |
| C09J 11/06 | (2006.01) |
| C09J 11/08 | (2006.01) |
| C08F 257/02 | (2006.01) |
| C08F 265/06 | (2006.01) |
| C09J 151/00 | (2006.01) |
| B29C 65/76 | (2006.01) |
| C08F 2/48 | (2006.01) |
| C09J 133/06 | (2006.01) |
| C08K 3/00 | (2006.01) |
| C08K 5/14 | (2006.01) |
| C08F 222/10 | (2006.01) |
| C09J 4/00 | (2006.01) |
| B29L 9/00 | (2006.01) |

(52) U.S. Cl.
CPC ............. *C09J 133/14* (2013.01); *B29C 65/76* (2013.01); *C08F 2/44* (2013.01); *C08F 2/48* (2013.01); *C08F 220/18* (2013.01); *C08F 220/20* (2013.01); *C08F 257/02* (2013.01); *C08F 265/06* (2013.01); *C09J 5/00* (2013.01); *C09J 11/06* (2013.01); *C09J 11/08* (2013.01); *C09J 133/06* (2013.01); *C09J 151/003* (2013.01); *B29L 2009/00* (2013.01); *C08F 222/1006* (2013.01); *C08K 3/0025* (2013.01); *C08K 5/14* (2013.01); *C09J 4/00* (2013.01); *Y10T 428/31935* (2015.04)

(58) Field of Classification Search
CPC ........ C08F 2/44; C08F 220/20; C08F 257/02; C08F 265/06; C08F 2/48; C08F 220/18; C08F 222/1006; C09J 133/14; C09J 5/00; C09J 11/06; C09J 11/08; C09J 151/003; C09J 133/06; C09J 4/00; C08K 9/10; C08K 3/0025; C08L 33/06; B29C 65/76; Y10T 428/31935; B29L 2009/00

See application file for complete search history.

(56) References Cited

U.S. PATENT DOCUMENTS

| 2010/0012263 A1* | 1/2010 | Oshima et al. ...... C08G 18/672 156/247 |
|---|---|---|
| 2011/0190412 A1 | 8/2011 | Studer et al. ................... 522/24 |
| 2013/0233479 A1* | 9/2013 | Kurimura et al. .... C03B 33/076 156/248 |

FOREIGN PATENT DOCUMENTS

| EP | 1 900 761 A1 | 3/2008 |
|---|---|---|
| EP | 2 383 303 A1 | 11/2011 |
| JP | 3-160077 A | 7/1991 |
| JP | 5-105847 A | 4/1993 |
| JP | 7-37274 A | 2/1995 |
| JP | 2808290 B2 | 10/1998 |
| JP | 11-323261 A | 11/1999 |
| JP | 2007-161871 A | 6/2007 |
| JP | 2007-217563 A | 8/2007 |
| JP | 2010-100831 A | 5/2010 |
| JP | 2010-248395 A | 11/2010 |
| JP | 2011-32335 A | 2/2011 |
| JP | 2011-89055 A | 5/2011 |
| JP | 2011-514393 A | 5/2011 |
| WO | WO 2007/004620 A1 | 1/2007 |
| WO | WO 2008/018252 A1 | 2/2008 |
| WO | WO 2009/095282 A2 | 8/2009 |

OTHER PUBLICATIONS

International Search Report mailed Dec. 18, 2012, issued in corresponding International Patent Application Serial No. PCT/JP2012/073707.
English Translation of International Preliminary Report on Patentability mailed Mar. 27, 2014, issued to corresponding International Application No. PCT/JP2012/073707.

* cited by examiner

*Primary Examiner* — Nathan M Nutter
(74) *Attorney, Agent, or Firm* — Stein IP, LLC (57) ABSTRACT

The present invention is intended to provide an adhesive composition for temporarily fixing which exhibits high adhesive strength and peeling property in water, and which is applicable to members having opaque area, and still which leaves no adhesive deposit on released members, so that it realize the excellent workability and environment. The present invention is a two-component composition for temporarily fixing members, comprising (A) a polyfunctional (meth)acrylate, (B) a mono-functional (meth)acrylate, (C) an organic peroxide, (D) a decomposition accelerator, (E) a polymerization initiator and (G) particulate matter, and composed of two-component system of a first agent and a second agent, said first agent containing at least said component (C) and said second agent containing at least said component (D), wherein cured body of said composition being used to bond members is brought into contact with water to be decomposed and release said members.

27 Claims, 2 Drawing Sheets

COMPOSITION AND METHOD FOR TEMPORARILY FIXING MEMBER USING SAME

CROSS-REFERENCE TO RELATED APPLICATIONS

This application is a national phase of International Application No. PCT/JP2012/073707, filed Sep. 14, 2012, which claims the benefit of Japanese Application No. 2011-201198, filed Sep. 14, 2011, in the Japanese Patent Office. All disclosures of the document(s) named above are incorporated herein by reference.

BACKGROUND OF THE INVENTION

1. Field of the Invention

The present invention relates to a method for temporarily fixing various members when processing those members, and a composition suitable for the temporarily fixing. For example, the present invention relates to a method for temporarily fixing a translucent rigid substrate, such as a glass plate, when processing those members. The present invention further relates to a two-component type adhesive composition which is photocurable and curable at ordinary temperature, and which is suitable for the above-mentioned use.

2. Description of the Related Art

For processing optical lens and optical members, and optical device, prism, members for semiconductor packaging and the like, an adhesive for temporarily fixing those members is employed. In display unit of various electronic devices such as a television, a notebook computer, a car navigation, an electronic calculator, a mobile phone, tablet computer, an electronic organizer, and a PDA (Personal Digital Assistant), displays such as a liquid crystal display (LCD), an organic EL display (OLED), an electroluminescence display (ELD), a field emission display (FED), and a plasma display (PDP) are used. In addition, a plate glass product for protection is placed to cover such a display in order to protect the display element. Recently, a specified printed pattern, for example, patterning for display screen image of a mobile phone, is often formed on the surface of the protection plate glass product in view of designing aspect. In most of cases, light does not transmit through those printed patterns.

The plate glass product is obtained by processing plate glass to have a size and shape which are suitable for each display unit. An adhesive for temporarily fixing is needed in order to make it possible to process a large amount of plate glass products with high production efficiency in order to meet market requirements for a certain price level.

Patent Document 1 proposes a photocurable adhesive composition which controls a glass transition temperature of a cured body of resin and which contains in a suitable amount particulate matters being insoluble in resin composition, and a method for temporarily fixing by using the composition.

Patent Document 2 describes an adhesive composition for temporarily fixing which has large water absorbability of a cured body of resin and large solubility in water, and which peels members in warm water after processing the members. It is also described that such adhesive composition may improve workability, since it is easy to adjust its viscosity, so that those could be filled in clearance gap where a low viscosity adhesive would flow out and padded by themselves.

Patent Document 3 describes an adhesive composition for temporarily fixing chip members comprising a crosslinkable compound having ethylenic unsaturated bond, a monomer containing at least one acidic phosphate group and at least one unsaturated bond, thermal polymerization initiator, inorganic filler and/or thixotropic agent, and photopolymerization initiator.

Patent Document 4 describes a two-component type photocurable adhesive composition for optical discs wherein the light-irradiated area is cured to the second and wherein non-irradiated area is cured in a short time by two-component reaction.

Patent Document 5 describes a method for temporarily fixing members comprising fixing members temporarily by two-component adhesive, processing the temporarily fixed member, and immersing the cured body of the composition in warm water of 90 degrees C. or less to release the processed members, wherein the two-component adhesive comprises (A) a polyfunctional (meth)acrylate, (B) a monofunctional (meth)acrylate, (C) a conducting substance, (D) a polymerization initiator and (E) a polymerization accelerator, composed of two-component system of a first agent and a second agent; said first agent containing at least (D) a polymerization initiator and said second agent containing at least (E) a polymerization accelerator.

PRIOR ART DOCUMENTS

Patent Document

D1: International Publication 2008/018252 Pamphlet
D2: Japanese Patent No. 2808290
D3: Japanese Laid-Opened Patent Publication No. H03-160077
D4: Japanese Laid-Opened Patent Publication No. H07-037274
D5: Japanese Laid-Opened Patent Publication No. 2011-32335

SUMMARY OF THE INVENTION

Problem to be Solved by the Present Invention

In the case of temporarily fixing a partially opaque member since plating patterns and electric wiring are formed on the member, the adhesive properties is sometimes insufficient merely by photocuring, so that there is provided a deviation between members when processing those members. Therefore, there is a room for improving an adhesive for temporarily fixing in order to ensure the size precision in processing the members.

Referring to any of Patent Documents 1 to 5, there is still a room with respect to properties required for temporarily fixing a partially opaque member. That is, in order to solve the problems for those conventional techniques, it is desired to realize an adhesive composition for temporarily fixing being excellent in workability and environment, which exhibits high adhesive strength and peeling property in water, and which is applicable to members having opaque area, and still which leaves no adhesive deposit on released members.

Means for Solving the Problem

The present inventors found, as a result of intensive study for solving the above problems, that it was possible to improve the effect of curing even for temporarily fixing a partially opaque member by blending specific accelerator and polymerization initiator which is not relied on photopolymerization with, and by introducing particulate matters to a conventional photopolymerization type adhesive composition for temporarily fixing; and such composition could provide thickness to a certain degree to the cured body of the composition, so that it is useful to ensure the size precision; and moreover such composition may exhibit excellent peeling property in water. Then, the present invention is accomplished.

That is, the present invention is directed to the followings.

(1) A two-component composition for temporarily fixing members, comprising (A) a polyfunctional (meth)acrylate, (B) a mono-functional (meth)acrylate, (C) an organic peroxide, (D) a decomposition accelerator, (E) a polymerization initiator and (G) particulate matter, and composed of two-component system of a first agent and a second agent, said first agent containing at least said component (C) and said second agent containing at least said component (D), wherein cured body of said composition being used to bond members is brought into contact with water to be decomposed and release said members.

(2) The composition as in (1), further comprising (F) organic thermally expandable particles.

(3) The composition as in (1) or (2), wherein a glass transition temperature of said cured body is 0 to 45 degrees C.

(4) The composition as in any one of (1) to (3), wherein said component (E) is one or two or more selected from a group consisting of Benzil Dimethylketal, oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

(5) The composition as in any one of (1) to (4), wherein said component (G) is one or two or more selected from a group consisting of cross-linked polymethyl(meth)acrylate particles, cross-linked polystyrene particles and cross-linked polymethyl(meth)acrylate/polystyrene copolymer particles.

(6) The composition as in any one of (1) to (5), wherein the average size of said component (G) is 20 to 200 µm.

(7) The composition as in any one of (1) to (6), wherein the standard deviation of distribution of particle volume to logarithm of particle size (µm) of said component (G) is 0.0001 to 0.25.

(8) The composition as in any one of (1) to (7), wherein said component (G) has spherical shape.

(9) The composition as in any one of (1) to (8), wherein said (A) a polyfunctional (meth)acrylate comprises polyfunctional (meth)acrylate oligomer/polymer, and/or polyfunctional (meth)acrylate monomer.

(10) The composition as in (9), wherein said polyfunctional (meth)acrylate oligomer/polymer comprises one or two or more selected from a group consisting of 1,2-polybutadiene-terminated urethane (meth)acrylate, polyester type urethane (meth)acrylate, and polyether type urethane (meth)acrylate.

(11) The composition as in (9), wherein said polyfunctional (meth)acrylate monomer comprises one or two or more selected from a group consisting of tripropylene glycol di(meth)acrylate, 1,9-nonanediol di(meth)acrylate, 1,6-hexanediol di(meth)acrylate, and dicyclopentanyl di(meth)acrylate.

(12) The composition as in any one of (1) to (11), wherein said (B) a mono-functional (meth)acrylate comprises one or two or more selected from a group consisting of phenol (2-mol ethylene oxide modified) (meth)acrylate, 2-(1,2-cyclohexadicarboxyimide)ethyl(meth)acrylate and 2-hydroxy-3-phenoxypropyl(meth)acrylate.

(13) The composition as in any one of (1) to (12), further comprising a polymerization inhibitor.

(14) The composition as in any one of (1) to (13), being a curable resin.

(15) The composition as in any one of (1) to (14), being photocurable.

(16) The composition as in any one of (1) to (15), being curable at ordinary temperature.

(17) The composition as in any one of (1) to (16), being photocurable and curable at ordinary temperature.

(18) An adhesive composition, comprising the composition as in any one of (1) to (17).

(19) The adhesive composition as in (18), being used in adhesion of members to one another, each of which comprises both of area of light transmittance of less than 0.1% and area of light transmittance of 50% or larger.

(20) The adhesive composition as in (18), being used in adhesion of members to one another, each of which has light transmittance of less than 0.1%.

(21) A structure obtained by bonding and fixing members to one another by the adhesive composition as in (18).

(22) A method for temporarily fixing members, comprising irradiating with visible light or ultraviolet light the adhesive composition as in (18) to bond and fix temporarily members to one another, processing said temporarily fixed members, irradiating with visible light or ultraviolet light said adhesive composition, bringing cured body of said adhesive composition into contact with water to release said cured body from said members.

(23) A method for temporarily fixing members, comprising irradiating with visible light or ultraviolet light the adhesive composition as in (18) to bond members to one another, leaving them to be fixed temporarily, then processing said temporarily fixed members, bringing cured body of said adhesive composition into contact with water to release said cured body from said members.

(24) A method for temporarily fixing members, comprising allowing the adhesive composition as in (18) to bond and fix temporarily members to one another, processing said temporarily fixed members, bringing cured body of said adhesive composition into contact with water to release said cured body from said members.

(25) The method for temporarily fixing members as in any one of (22) to (24), wherein said adhesive composition is obtained by preliminarily mixing the first agent and the second agent.

(26) The method for temporarily fixing members as in any one of (22) to (25), wherein a bonded layered article is obtained by bonding and layering 2 to 100 pieces of members, and thereafter said bonded layered article is immersed in water to release said cured body of adhesive composition from said bonded layered article.

(27) The method for temporarily fixing members as in any one of (22) to (26), wherein said member comprises both of area of light transmittance of less than 0.1% and area of light transmittance of 50% or larger.

(28) The method for temporarily fixing members as in any one of (22) to (26), wherein said member has light transmittance of less than 0.1%.

Effects of Invention

According to the present invention, even member is opaque partially or entirely, such opaque area may be effectively cured, so as to provide, with high size precision, processed members which is excellent in adhesive and peeling property, and which leaves no adhesive deposit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

(A) polyfunctional (meth)acrylate includes polyfunctional (meth)acrylate oligomer/polymer which has two or more (meth)acryloyl groups at terminals or in side chains thereof, and polyfunctional (meth)acrylate monomer which has two or more (meth)acryloyl groups. Polyfunctional (meth)acrylate means a compound having two or more (meth)acroyl groups.

Examples of polyfunctional (meth)acrylate oligomer/polymer include 1,2-polybutadiene-terminated urethane (meth)acrylate ("TE-2000" or "TEA-1000" available from Nippon Soda Co., Ltd., for example), hydrogen additive thereof ("TEAM 000" available from Nippon Soda Co., Ltd., for example), 1,4-polybutadiene-terminated urethane (meth)acrylate ("BAC-45" available from Osaka Organic Chemical Industry Ltd.), polyisoprene-terminated (meth)acrylate, polyester type urethane (meth)acrylate ("UV-2000B", "UV-3000B", or "UV-7000B" available from Nippon Synthetic Chemical Industry Co., Ltd., or "KHP-11" or "KHP-17" available from Negami Chemical Industry Co., Ltd., for example), polyether type urethane (meth)acrylate ("UV-3700B" or "UV-6100B" available from Nippon Synthetic Chemical Industry Co., Ltd., for example), and bisphenol A type epoxy(meth)acrylate. Among them, in terms of high effectiveness, one or two or more selected from a group consisting of 1,2-polybutadiene-terminated urethane (meth)acrylate, polyester type urethane (meth)acrylate and polyether type urethane (meth)acrylate are preferable, and polyester type urethane (meth)acrylate is more preferable.

Here, urethane (meth)acrylate means urethane (meth)acrylate which can be obtained by causing a polyol compound (hereinafter, referred to as X), an organic polyisocyanate compound (hereinafter, referred to as Y), and hydroxyl(meth)acrylate (hereinafter, referred to as Z) to react (polycondensation reaction), and which has urethane bonds within a molecule.

Examples of the polyol compound (X) include multiple alcohol such as ethylene glycol, diethylene glycol, triethylene glycol, tetraethylene glycol, polyethylene glycol, propylene glycol, dipropylene glycol, polypropylene glycol, butylene glycol, 1,4-butanediol, polybutylene glycol, 1,5-pentanediol, 1,6-hexanediol, 1,8-octanediol, 1,9-nonanediol, 3-methyl-1,5-pentanediol, 2,4-diethyl-1,5-pentanediol, 2,2-butylethyl-1,3-propanediol, neopentyl glycol, cyclohexanedimethanol, hydrogenated bisphenol A, polycaprolactone, trimethyloletahne, trimethylolpropane, polytrimethylolpropane, pentaerythritol, polypentaerythritol, sorbitol, mannitol, glycerin, polyglycerin, and poly tetramethylene glycol; polyether polyol which has at least one kind of structure of polyethylene oxide, polypropylene oxide, or block or random copolymer of ethylene oxide/propylene oxide; polyester polyol which is a condensation product of above multiple alcohol or polyether polyol and polybasic acid such as maleic acid anhydride, maleic acid, fumaric acid, itaconic acid anhydride, itaconic acid, adipic acid, or isophthalic acid; caprolactone modified polyol such as caprolactone modified poly tetramethylene polyol; polyolefin type polyol; polycarbonate type polyol; polydiene type polyol such as polybutadiene polyol, polyisoprene polyol, hydrogenated polybutadiene polyol, or hydrogenated polyisoprene polyol; and silicone polyol such as polydimethylsiloxane polyol. Among them, polyether polyol and/or polyester polyol is more preferable.

Here, polybutadiene-terminated urethane (meth)acrylate is a compound, for example, in which the polyol compound (X) corresponds with polybutadiene polyol and the terminal structure is (meth)acrylate, and polyester type urethane (meth)acrylate is a compound, for example, in which the polyol compound (X) corresponds with polyester polyol, and polyether type urethane (meth)acrylate is a compound, for example, in which the polyol compound (X) corresponds with polyether polyol.

It is not particularly necessary to limit the organic polyisocyanate compound (Y), and it is possible to use polyisocyanate of an aromatic type, an aliphatic type, a cyclic aliphatic type, an alicyclic type, or the like, and particularly, polyisocyanate such as tolylene diisocyanate (TDI), diphenylmethane diisocyanate (MDI), hydrogenated diphenylmethane diisocyanate (H-MDI), polyphenyl methane polyisocyanate (crude MDI), modified diphenylmethane diisocyanate (modified MDI), hydrogenated xylylene diisocyanate (H-XDI), xylylene diisocyanate (XDI), hexamethylene diisocyanate (HMDI), trimethylhexamethylene diisocyanate (TMXDI), tetramethylxylylene diisocyanate (m-TMXDI), isophorone diisocyanate (IPDI), norbornene diisocyanate (NBDI), or 1,3-bis(isocyanatomethyl)cyclohexane (H6XDI); or a trimeric compound of such polyisocyanate; or a reaction product of such polyisocyanate and polyol is preferably used. Among them, hydrogenated xylylene diisocianate (H-XDI) and/or isophorone diisocyanate (IPDI) is preferable.

Hydroxyl(meth)acrylate (Z) includes 2-hydroxyethyl (meth)acrylate, 2-hydroxypropyl(meth)acrylate, 2-hydroxybutyl(meth)acrylate, 2-hydroxyethyl acryloyl phosphate, 4-butylhydroxy(meth)acrylate, 2-(meth)acryloyloxyethyl-2-hydroxypropyl phthalate, glycerin di(meth)acrylate, 2-hydroxy-3-(meth)acryloyloxypropyl(meth)acrylate, caprolactone modified 2-hydroxyethyl(meth)acrylate, pentaerythritol tri(meth)acrylate, dipentaerythritol penta(meth)acrylate, and caprolactone modified 2-hydroxyethyl (meth)acrylate. Among them, one or more kinds among a group consisting of 2-hydroxyethyl(meth)acrylate, 2-hydroxypropyl(meth)acrylate, and 2-hydroxybutyl(meth)acrylate are preferable.

The weight average molecular weight of polyfunctional (meth)acrylate oligomer/polymer is preferably from 5000 to 60000, and more preferably from 6000 to 40000. In examples, the weight average molecular weight was measured by using tetrahydrofuran as solvent, using a GPC system (SC-8010 manufactured by Tosoh Corporation), and creating a calibration curve with commercially available standard polystyrene under the following conditions.

Row rate: 1.0 ml/min
Preset temperature: 40 degrees C.
Column configuration: total of three columns (total number of theoretical stages: 32,000 stages); one is "TSK guardcolumn MP (xL)" 6.0 mmID×4.0 cm manufactured by Tosoh Corporation, and two are "TSK-GEL MULTIPORE-HXL-M" 7.8 mmID×30.0 cm (number of theoretical stages: 16,000 stages) manufactured by Tosoh Corporation.
Sample injection amount: 100 μl (concentration of sample solution: 1 mg/ml)
Solution sending pressure: 39 kg/cm$^2$
Detector: RI detector Further, polyfunctional (meth)acrylate includes a bifunctional (meth)acrylate monomer, a trifunctional (meth)acrylate monomer and a tetrafunctional or more functional (meth)acrylate monomer. Among of those polyfunctional (meth)acrylates, a bifunctional (meth)acrylate monomer is preferable.

Bifunctional (meth)acrylate monomer includes 1,3-butylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dicyclopentanyl di(meth)acrylate, neopentyl glycol modified trimethylolpropane di(meth)acrylate, stearic acid modified pentaerythritol di(meth)acrylate, tripropylene glycol di(meth)acrylate, 2,2-bis(4-(meth)acryloxy diethoxyphenyl) propane, 2,2-bis(4-(meth)acryloxy propoxyphenyl) propane, 2,2-bis(4-(meth)acryloxy tetraethoxyphenyl) propane, dimethylol-tricyclodecane di(meth)acrylate, 1,10-decanediol di(meth)acrylate and isocyanuric acid ethylene oxide modified di(meth)acrylate. Among them, in terms of high effectiveness, one or two or more selected from a group consisting of 1,9-nonanediol di(meth)acrylate, 1,6-hexanediol di(meth)acrylate, dicyclopentanyl di(meth)acrylate and tripropylene glycol di(meth)acrylate is preferable; and tripropylene glycol di(meth)acrylate and dicyclopentanyl di(meth)acrylate are more preferable. In particular, dicyclopentanyl di(meth)acrylate is most preferable in view of high effectiveness both in UV curing and redox curing.

Trifunctional (meth)acrylate monomer includes trimethylolpropane tri(meth)acrylate, tris[(meth)acryloxyethyl]isocyanurate.

Tetrafunctional or more functional (meth)acrylate monomers include dimethylolpropane tetra(meth)acrylate, pentaerythritol tetra(meth)acrylate, pentaerythritolethoxy tetra(meth)acrylate, dipentaerythritol penta(meth)acrylate, and dipentaerythritol hexa(meth)acrylate.

(A) Polyfunctional (meth)acrylate is preferably hydrophobic. Here mentioned hydrophobic means properties of being poorly soluble in water or being poorly mixed with water. Hydrophobic polyfunctional (meth)acrylate includes 1,3-butylene glycol di(meth)acrylate, butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, dicyclopentanyl di(meth)acrylate, neopentyl glycol modified trimethylolpropane di(meth)acrylate, stearic acid modified pentaerythritol di(meth)acrylate, polypropylene glycol di(meth)acrylate, 2,2-bis(4-(meth)acryloxy diethoxyphenyl)propane, 2,2-bis(4-(meth)acryloxy propoxyphenyl)propane, 2,2-bis(4-(meth)acryloxy tetraethoxyphenyl)propane, isocyanuric acid ethylene oxide modified di(meth)acrylate and 1,10-decanediol di(meth)acrylate.

Hydrophobic trifunctional (meth)acrylate monomer includes trimethylolpropane tri(meth)acrylate, tris[(meth)acryloxyethyl]isocyanurate.

Hydrophobic tetrafunctional or more functional (meth)acrylate monomers include dimethylolpropane tetra(meth)acrylate, pentaerythritol tetra(meth)acrylate, pentaerythritolethoxy tetra(meth)acrylate, dipentaerythritol penta(meth)acrylate, and dipentaerythritol hexa(meth)acrylate.

When (A) polyfunctional (meth)acrylate is water-soluble, there is a concern that swelling of a cured body of the composition causes positional deviation during cutting processing and size precision in processing deteriorates, which is undesirable. However, hydrophilic (A) polyfunctional (meth)acrylate may be used as long as the cured body of the composition does not significantly swell or is not partially dissolved due to water.

Among (A) polyfunctional (meth)acrylate, it is preferably to contain polyfunctional (meth)acrylate oligomer/polymer and/or bifunctional (meth)acrylate monomer in view of high effectiveness, and it is more preferable to use both polyfunctional (meth)acrylate oligomer/polymer and bifunctional (meth)acrylate monomer. As for the content ratio when both polyfunctional (meth)acrylate oligomer/polymer and bifunctional (meth)acrylate monomer are used, the mass ratio of polyfunctional (meth)acrylate oligomer/polymer: bifunctional (meth)acrylate monomer in total of 100 parts by mass of polyfunctional (meth)acrylate oligomer/polymer and bifunctional (meth)acrylate monomer preferably satisfies 15 to 97:3 to 85, more preferably satisfies 25 to 95:5 to 75, and most preferably satisfies 35 to 70:65 to 30, in particular, 45 to 65:35 to 55.

The usage amount of (A) polyfunctional (meth)acrylate is, with respect to the total of 100 parts by mass of (A) and (B), preferably 5 to 95 parts by mass, and more preferably 20 to 65 parts by mass, and most preferably 25 to 50 parts by mass. When the amount is 5 parts by mass or more, the peeling property of cured body of the composition from adherend (hereinafter, simply referred to "peeling property") is fully promoted. When the amount is 95 parts by mass or less, there is little concern that the initial adhesive properties does not decrease.

Monofunctional (meth)acrylate means a compound (monomer) having one (meth)acroyl group.

(B) monofunctional (meth)acrylate monomer includes methyl(meth)acrylate, ethyl(meth)acrylate, propyl(meth)acrylate, butyl(meth)acrylate, 2-ethylhexyl(meth)acrylate, isooctyl(meth)acrylate, isodecyl(meth)acrylate, lauryl (meth)acrylate, stearyl(meth)acrylate, phenyl(meth)acrylate, cyclohexyl(meth)acrylate, dicyclopentanyl(meth)acrylate, dicyclopentenyl(meth)acrylate, dicyclopentenyloxy ethyl(meth)acrylate, isobornyl(meth)acrylate, methoxylated cyclodecatriene(meth)acrylate, 2-hydroxyethyl(meth)acrylate, 2-hydroxypropyl(meth)acrylate, 3-hydroxypropyl (meth)acrylate, 4-hydroxybutyl(meth)acrylate, tetrahydrofurfuryl(meth)acrylate, 2-hydroxy-3-phenoxypropyl(meth) acrylate, glycidyl(meth)acrylate, caprolactone modified tetrahydrofurfuryl(meth)acrylate, 3-chloro-2-hydroxypropyl (meth)acrylate, N,N-dimethylaminoethyl(meth)acrylate, N,N-diethylaminoethyl(meth)acrylate, t-butylaminoethyl (meth)acrylate, ethoxycarbonylmethyl(meth)acrylate, phenolethylene oxide modified (meth)acrylate, phenol (2-mol ethylene oxide modified) (meth)acrylate, phenol (4-mol ethylene oxide modified) (meth)acrylate, para-cumylphenolethylene oxide modified (meth)acrylate, nonylphenol ethylene oxide modified (meth)acrylate, nonylphenol (4-mol ethylene oxide modified) (meth)acrylate, nonylphenol (8-mol ethylene oxide modified) (meth)acrylate, nonylphenol (2.5-mol propylene oxide modified) (meth)acrylate, 2-ethylhexylcarbitol(meth)acrylate, ethylene oxide modified phthalic acid (meth)acrylate, ethylene oxide modified succinic acid (meth)acrylate, trifluoroethyl(meth)acrylate, (meth)acrylic acid, ω-carboxy-polycaprolactone mono (meth)acrylate, phthalic acid monohydroxyethyl(meth)acrylate, (meth)acrylic acid dimer, β-(meth)acroyloxyethyl hydrogen succinate, n-(meth)acryloyloxyalkyl hexahydro phthalimide, 2-(1,2-cyclohexadicarboxyimide)ethyl(meth)acrylate.

(B) monofunctional (meth)acrylate is preferably hydrophobic. Here mentioned hydrophobic means properties of being poorly soluble in water or being poorly mixed with water. Hydrophobic monofunctional (meth)acrylate includes methyl(meth)acrylate, ethyl(meth)acrylate, propyl(meth)acrylate, butyl(meth)acrylate, 2-ethylhexyl(meth)acrylate, isooctyl(meth)acrylate, isodecyl(meth)acrylate, lauryl (meth)acrylate, stearyl(meth)acrylate, phenyl(meth)acrylate, cyclohexyl(meth)acrylate, dicyclopentanyl(meth)acrylate, dicyclopentenyl(meth)acrylate, dicyclopentenyloxy ethyl(meth)acrylate, isobornyl(meth)acrylate, methoxylated cyclodecatriene(meth)acrylate, tetrahydrofurfuryl(meth)acrylate, 2-hydroxy-3-phenoxypropyl(meth)acrylate, glycidyl(meth)acrylate, caprolactone modified tetrahydrofurfuryl(meth)acrylate, 3-chloro-2-hydroxypropyl(meth)acrylate, N,N-dimethylaminoethyl(meth)acrylate, N,N-diethylaminoethyl(meth)acrylate, t-butylaminoethyl(meth)acrylate, ethoxycarbonylmethyl(meth)acrylate, phenolethylene oxide modified (meth)acrylate, phenol (2-mol ethylene oxide modified) (meth)acrylate, phenol (4-mol ethylene oxide modified) (meth)acrylate, para-cumylphenolethylene oxide modified (meth)acrylate, nonylphenol ethylene oxide modified (meth)acrylate, nonylphenol (4-mol ethylene oxide modified) (meth)acrylate, nonylphenol (8-mol ethylene oxide modified) (meth)acrylate, nonylphenol (2.5-mol propylene oxide modified) (meth)acrylate, 2-ethylhexylcarbitol (meth)acrylate, ethylene oxide modified phthalic acid (meth)acrylate, ethylene oxide modified succinic acid (meth)acrylate, trifluoroethyl(meth)acrylate, co-carboxy-polycaprolactone mono(meth)acrylate, phthalic acid monohydroxyethyl(meth)acrylate, (meth)acrylic acid dimer, β-(meth)acroyloxyethyl hydrogen succinate, n-(meth)acryloyloxyalkyl hexahydro phthalimide, 2-(1,2-cyclohexadicarboxyimide)ethyl(meth)acrylate. When (B) monofunctional (meth)acrylate is water-soluble, there is a concern that swelling of a cured body of the composition causes positional deviation during cutting processing and processing precision deteriorates, which is undesirable. However, hydrophilic (B) monofunctional (meth)acrylate may be used as long as the cured body of the composition does not significantly swell or is not partially dissolved due to water.

Among monofunctional (meth)acrylate, one or more kinds from a group consisting of 2-mol phenolethylene oxide modified (meth)acrylate, 2-(1,2-cyclohexadicarboxyimide)ethyl(meth)acrylate, and 2-hydroxy-3-phenoxypropyl (meth)acrylate are preferable in terms of high effectiveness. It is more preferable to use all of 2-mol phenolethylene oxide modified (meth)acrylate, and 2-(1,2-cyclohexadicarboxyimide)ethyl(meth)acrylate and/or 2-hydroxy-3-phenoxypropyl(meth)acrylate. In particular, it is most preferable to use both of 2-mol phenolethylene oxide modified (meth)acrylate and 2-hydroxy-3-phenoxypropyl(meth)acrylate in view of high effectiveness both in UV curing and redox curing. As for the content ratio when all of 2-mol phenolethylene oxide modified (meth)acrylate, and 2-(1,2-cyclohexadicarboxyimide)ethyl(meth)acrylate and/or 2-hydroxy-3-phenoxypropyl(meth)acrylate are used in total of 100 parts by mass of 2-mol phenolethylene oxide modified (meth)acrylate, 2-(1,2-cyclohexadicarboxyimide)ethyl(meth)acrylate, and 2-hydroxy-3-phenoxypropyl(meth)acrylate, a mass ratio of 2-mol phenolethylene oxide modified (meth)acrylate:2-(1,2-cyclohexadicarboxyimide)ethyl(meth)acrylate and/or 2-hydroxy-3-phenoxypropyl(meth)acrylate preferably satisfies 10 to 70:30 to 90, more preferably satisfies 20 to 60:40 to 80, and most preferably satisfies 30 to 50:50 to 70.

The usage amount of (B) monofunctional (meth)acrylate is, with respect to the total of 100 parts by mass of (A) and (B), preferably 5 to 95 parts by mass, and more preferably 35 to 80 parts by mass, and most preferably 50 to 75 parts by mass. When the amount is 5 parts by mass or more, there is little concern that the initial adhesive properties does not decrease. When the amount is 95 parts by mass or less, the peeling property are possibly ensured.

(C) Organic peroxide includes diacyl peroxides such as lauroyl peroxide and benzoyl peroxide; alkyl peroxyesters such as t-butyl peroxy-3,5,5-trimethylhexanoate, cumyl peroxyneodecanoate, hexyl peroxypivalate, t-butyl peroxyisobutyrate, t-butyl peroxypivalate, t-butyl peroxyacetate, t-butyl peroxybenzoate and tertiary butyl peroxy-2-ethylhexanate; peroxydicarbonates such as diisopropyl peroxydicarbonate, di-2-ethylhexyl peroxydicarbonate, di-normal-propyl peroxydicarbonate, bis(4-tertiary butyl cyclohexyl) peroxydicarbonate, di-2-ethoxyethyl peroxydicarbonate, dimethoxyisopropyl peroxydicarbonate, di(3-methyl-3-methoxybutyl)peroxydicarbonate and diallyl peroxydicarbonate; peroxycarbonates such as t-butyl peroxyisopropylcarbonate; peroxy ketals such as di-t-butyl peroxy cyclohexane and di-(t-butyl peroxy)butane; dialkyl peroxides such as dicumyl peroxide, t-butyl cumyl peroxide and di-t-butyl peroxide; hydroperoxides such as cumene hydroperoxide and tetramethylbutyl hydroperoxide; ketone peroxides such as cyclohexanone peroxide. Among these, alkyl peroxyesters and/or hydroperoxides are preferable, and hydroperoxides are more preferable, and cumene hydroperoxide is most preferable.

The usage amount of (C) organic peroxide is, with respect to the total of 100 parts by mass of (A) and (B), preferably 0.01 to 10 parts by mass, and more preferably 0.05 to 5 parts by mass, and most preferably 1 to 3 parts by mass. When the amount is 0.01 part by mass or more, it is possible to reliably obtain the curing property. When the amount is 10 parts by mass or less, it is possible to realize sufficient storage stability and reduce dermal irritancy.

For (D) decomposition accelerator of organic peroxide, it is preferably to use a decomposition accelerator which promotes decomposition of the organic peroxide. Such decomposition accelerator promoting decomposition of (C) organic peroxide is exemplified as the following.

When hydroperoxides and ketone peroxides are used as organic peroxide, it is possible to use organic acid metal salt and organic metal chelate as the decomposition accelerator. Such organic acid metal salt and organic metal chelate include cobalt naphthenate, copper naphthenate, manganese naphthenate, cobalt octenoate, copper octenoate, manganese octenoate, cobalt octylate, copper acetylacetonate, titanium acetylacetonate, manganese acetylacetonate, chromium acetylacetonate, iron acetylacetonate, vanadinyl acetylacetonate, and cobalt acetylacetonate.

In addition, other examples of the decomposition accelerator include thiourea derivatives such as diethyl thiourea, dibutyl thiourea, ethylene thiourea, tetramethyl thiourea, benzoyl thiourea; and mercaptobenzimidazole.

Furthermore, when organic peroxide of diacyl peroxides such as benzoyl peroxide is used, it is possible to use amines as the decomposition accelerator. Such amines include N,N-dimethyl-p-toluidine, N,N-diethyl-p-toluidine, N,N-di(2-hydroxyethyl)-p-toluidine, N,N-diisopropanol-p-toluidine, triethylamine, tripropylamine, ethyldiethanolamine, N,N-dimethylaniline, ethylenediamine, triethanolamine, and an aldehyde-amine condensation reaction product.

One or two or more kinds of such (D) decomposition accelerator of organic peroxide can be used.

The usage amount of (D) decomposition accelerator is, with respect to the total of 100 parts by mass of (A) and (B), preferably 0.01 to 10 parts by mass, and more preferably 0.05 to 5 parts by mass, and most preferably 0.3 to 3 parts by mass. When the amount is 0.01 part by mass or more, it is possible to reliably obtain the curing property. When the amount is 10 parts by mass or less, it is possible to realize sufficient storage stability.

(E) photopolymerization initiator is blended in order to increase sensitivity by sensitizing by an activated light ray such as a visible light ray or an ultraviolet ray and promote light curing of the resin composition. Such photopolymerization initiator includes benzophenone or a derivative thereof; benzil or a derivative thereof; anthraquinone or a derivative thereof; benzoin; benzoin derivatives such as benzoin methyl ether, benzoin ethyl ether, benzoin propyl ether, benzoin isobutyl ether, and benzyl dimethyl ketal; acetophenone derivatives such as diethoxyacetophenone, and 4-t-butyl trichloroacetophenone; 2-dimethylamino ethyl benzoate; p-dimethylamino ethyl benzoate; diphenyl disulfide; thioxanthone or a derivative thereof; camphorquinone; camphorquinone derivatives such as 7,7-dimethyl-2,3-dioxobicyclo[2.2.1]heptane-1-carboxylic acid, 7,7-dimethyl-2,3-dioxobicyclo[2.2.1]heptane-1-carboxy-2-bromoethyl ester, 7,7-dimethyl-2,3-dioxobicyclo[2.2.1]heptane-1-carboxy-2-methyl ester, 7,7-dimethyl-2,3-dioxobicyclo[2.2.1]heptane-1-carboxylic acid chloride; α-aminoalkyl phenone derivatives such as 2-methyl-1-[4-(methylthio)phenyl]-2-morpholinopropane-1-one, and 2-benzyl-2-dimethylamino-1-(4-morpholinophenyl)-butanone-1; acyl phosphine oxide derivatives such as benzoyl diphenylphosphine oxide, 2,4,6-trimethylbenzoyl diphenylphosphine oxide, benzoyl diethoxyphosphine oxide, 2,4,6-trimethylbenzoyl dimethoxyphenylphosphine oxide, and 2,4,6-trimethylbenzoyl diethoxyphenylphosphine oxide, oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester. One or two or more kinds of photopolymerization initiator can be used in combination. Among them, one or two or more kinds selected from a group consisting of benzil dimethyl ketal, oxy-phenyl-acetic acid 2-[2-oxo-2-phenyl-acetoxy-ethoxy]-ethyl ester, and oxy-phenyl-acetic acid 2-[2-hydroxy-ethoxy]-ethyl ester are preferable in view of high effectiveness.

The usage amount of (E) photopolymerization initiator is, with respect to the total of 100 parts by mass of (A) and (B), preferably 0.1 to 20 parts by mass, and more preferably 0.5 to 15 parts by mass, and most preferably 0.8 to 2.5 parts by mass. When the amount is 0.1 part by mass or more, it is possible to reliably achieve the effect of promoting curing. When the amount is 20 parts by mass or less, a sufficient curing speed can be achieved. It is more preferable to add 1 part by mass or more of the component (E) since it is possible to implement curing regardless of the light irradiation amount, a degree of cross-linking of the cured body of the composition further increases, so that positional deviation and the like do not occur during the cutting work, and the peeling property is enhanced.

For (G) particulate matter, it is preferably to use a particulate matter which is not dissolved in any of the components (A) to (E). Using such particulate matter, it is easy to allow the cured body to maintain a predetermined thickness and to thereby realize adhesion of members with the improved processing precision. Furthermore, the thickness of the cured body is controlled to thereby stably obtain the peeling property.

For (G) particulate matter which is not dissolved in any of the components (A) to (E), any of organic particles and inorganic particles may be used. Specifically, examples of the organic particles include polyethylene particles, polypropylene particles, cross-linked poly methyl(meth)acrylate particles, cross-linked polystyrene particles, and copolymer particles of cross-linked poly methyl(meth)acrylate/polystyrene. Examples of the inorganic particles include ceramic particles such as glass, silica, alumina, titanium.

The particulate matter (G) preferably has a spherical shape from the viewpoint of enhancement of processing precision, namely control of the film thickness of the adhesive. Among of the organic particles, one or more kinds selected from a group consisting of cross-linked poly methyl (meth)acryate particles, cross-linked polystyrene particles and copolymer particles of cross-linked poly methyl(meth)acrylate/polystyrene are preferable, and the most preferable are cross-linked polystyrene particles, in view of the fact that those particles are less deformed and the thickness of the cured body due to the variations of the particle size hardly varies. Such cross-linked poly methyl(meth)acryate particles, cross-linked polystyrene particles and copolymer particles of cross-linked poly methyl(meth)acrylate/polystyrene may be obtained as monodisperse particles by a conventionally known emulsion polymerization method of, for example, methyl(meth)acrylate monomer or styrene monomer, respectively, and cross-linkable monomer. For the inorganic particles, spherical silica is preferable in view of the fact that those particles are less deformed and the thickness of the cured body due to the variations of the particle size hardly varies. Among those, the organic particles are further more preferable from viewpoints of storage stability such as sedimenting of the particles and reactivity of the composition.

The average particle size as measured by the laser method of the particulate matter (G) is preferably within a range from 20 μm to 200 μm. When the average particle size of the particulate matter is 20 μm or larger, an excellent peeling property is achieved. When the average particle size is 200 μm or smaller, and deviation of the members which have been temporarily fixed is not easily generated and excellent dimensional precision can be achieved. The average particle size is more preferably from 35 μm to 150 μm, and further more preferably from 50 μm to 120 μm from a viewpoint of the peeling property and the dimensional precision. The particle size and the deviation of particle size distribution are measured by a laser diffraction type particle size distribution measurement apparatus SALD-2200 manufactured by Shimadzu Corporation.

The standard deviation of distribution of particle volume to logarithm of particle size (μm) of the particulate matter (G) is preferably 0.0001 to 0.25. When the standard deviation of the particle size of the particulate matter is within the above range, the cured body may hardly vary due to the variations of the particle size, so that the deviation of the members which have been temporarily fixed should not be easily generated during processing and excellent dimensional precision can be achieved, and further that the peeling property may be enhanced. In view of dimensional precision and peeling property, the standard deviation of the particle size of the particulate matter may be preferably 0.0001 to 0.15, and more preferably 0.0001 to 0.1, and still further preferably 0.0001 to 0.08, and remarkably preferably 0.0001 to 0.072.

The usage amount of (G) particulate matter is, with respect to the total of 100 parts by mass of (A) and (B), preferably 0.1 to 20 parts by mass, and more preferably 0.2 to 10 parts by mass, and most preferably 0.2 to 5 parts by mass from the viewpoint of the adhesive strength, the processing precision, and the peeling property.

The composition of the present invention may further contain (F) organic thermally expandable particles in view of ensuring the adhesive properties before peeling the cured body and the dimensional precision during processing as well as providing the effect of promoting peeling.

For (F) organic thermally expandable particles, it is preferably to use organic thermally expandable particles which are not dissolved in any of the components (A) to (E). Microcapsules in which organic solvent is encapsulated by organic materials (polymers) may be used as such (F) organic thermally expandable particles. For example, such particles are one which are expanded to 5 to 250 times by volume after the outer envelope of organic materials is softened by heating and inner solvent is vapored. It is preferable to use organic thermally expandable particles, for example, in which organic solvent including isobutane, pentane, petroleum ether, hexane, octane and isooctane is used as the inner solvent, such organic solvent is encapsulated by the outer of thermoplastic resin such as vinylidene chloride, acrylonitrile, acrylic ester and methacrylic ester.

The average particle size of (F) organic thermally expandable particles is preferably 2 to 100 μm, and more preferably 5 to 50 μm, and most preferably 8 to 20 μm. When the average particle size is 2 μm or larger, peeling property of the composition is excellent. When the average particle size is 100 μm or smaller, the adhesive properties of the composition before peeling should not decrease.

The foam initiating temperature of (F) organic thermally expandable particles is preferably 70 to 130 degrees C., and more preferably 75 to 100 degrees C. When the temperature is 70 degrees C. or higher in view of dimensional precision and peeling property, the organic thermally expandable particles should not be expanded by processing heat during processing members, so that dimensional precision is realized. When the temperature is 130 degrees or lower, the organic thermally expandable particles exhibit excellent peeling property after processing.

The usage amount of (F) organic thermally expandable particles is, with respect to the total of 100 parts by mass of (A) and (B), preferably 0.1 to 29.9 parts by mass, and more preferably 1 to 20 parts by mass, and most preferably 5 to 15 parts by mass from the viewpoint of the effect for promoting peeling and adhesive properties. When the amount is 0.1 part by mass or more, it is possible to reliably achieve the effect of promoting curing. When the amount is 29.9 parts by mass or less, a sufficient adhesive properties can be achieved.

The composition of the invention may employ (H) polymerization inhibitor in order to improve storage stability. Examples of the polymerization inhibitor include methylhydroquinone, hydroquinone, 2,2-methylene-bis(4-methyl-6-tertiary butylphenol), catechol, hydroquinone monomethyl ether, monotertiary butylhydroquinone, 2,5-ditertiary butylhydroquinone, p-benzoquinone, 2,5-diphenyl-p-benzoquinone, 2,5-ditertiary butyl-p-benzoquinone, picric acid, citric acid, phenothiazine, tertiary butylcatechol, 2-butyl-4-hydroxyanisole, and 2,6-ditertiary butyl-p-cresol. Among them, 2,2-methylene-bis(4-methyl-6-tertiary butylphenol) and/or citric acid are preferable in view of high effectiveness.

The usage amount of the polymerization inhibitor is, with respect to the total of 100 parts by mass of (A) and (B), preferably from 0.001 parts by mass to 3 parts by mass, and more preferably from 0.05 parts by mass to 2 parts by mass, and still preferably 0.1 to 0.3 parts by mass. When the amount is 0.001 parts by mass or more, it is possible to secure the storage stability. When the amount is 3 parts by mass or less, it is possible to obtain a satisfactory adhesive property and non-curing does not occur. Further, by adding (H) polymerization inhibitor within this range, the suitable working life may be achieved. When the working life is short, it is sometimes impossible to stick members together with high dimensional precision. When the working life is too long, uncured state would occur.

Additives such as generally used various kinds of elastomer such as acrylic rubber, urethane rubber, and acrylonitrile-butadiene-styrene rubber; solvent such as a polar organic solvent; extending material; strengthening agent; plasticizer; thickening agent; dye; pigment; flame retardant; silane coupling agent, and surfactant may be used within a range that does not lose the object of the present invention.

A cured body by redox curing and/or a cure body by UV curing both obtained from the composition of the invention have preferably the glass transition temperature of 0 to 45 degrees C. When the glass transition temperature is within this range, swell is widely occurred by curing strain of the cure body, so that the peeling property should be enhanced. As a result, adhesion area is reduced, and the adhesive strength decreases, so that the cured body may easily be released. When the glass transition temperature of the cured body from the composition is 0 degree C. or higher, the deviation of the members should not be easily generated in use thereof and excellent adhesion precision can be achieved. When the glass transition temperature is 45 degrees C. or less, excellent peeling property can be achieved. In view of the adhesion precision and the peeling property, the glass transition temperature of the cured body from the composition is more preferably 5 to 40 degrees C., and most preferably 10 to 35 degrees C.

The transition temperature of the cured body from the composition of the invention may be measured in accordance with the conventional method such as DSC, dynamic viscoelasticity spectra. The preferable method is the dynamic viscoelasticity spectra method.

Examples of method for temporarily fixing members in which the members are irradiated by visible light ray or ultraviolet ray to be cured include an adhesion method in which the composition is irradiated by at least one of visible light ray or ultraviolet ray to enhance the adhesive properties. Such source for energy irradiation of visible light ray or ultraviolet ray includes deuterium lamp, high-pressure mercury lamp, extra high pressure mercury lamp, low-pressure mercury lamp, xenon lamp, xenon-mercury mixture lamp, halogen lamp, excimer lamp, indium lamp, thallium lamp, LED lamp and electrodeless discharge lamp.

Figure 1:
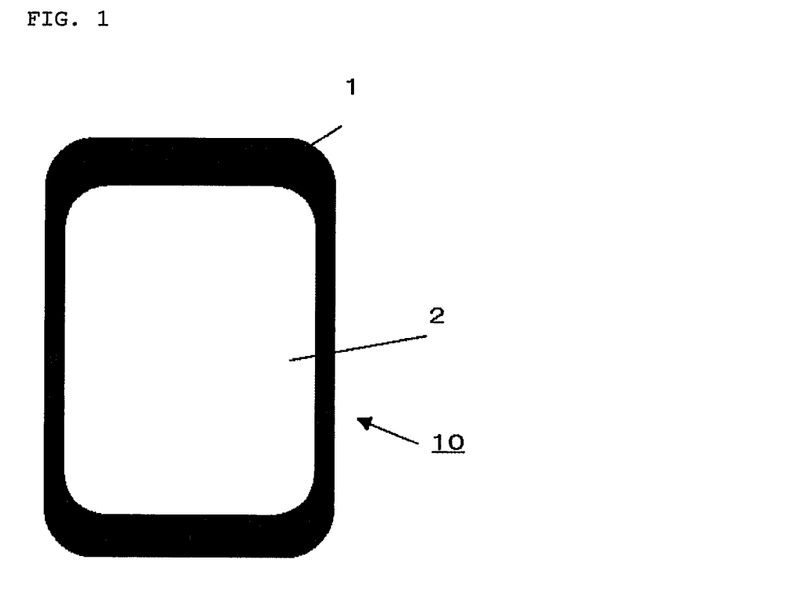
FIG. 1 shows an embodiment of patterning for a display screen of a mobile phone.

The composition of the invention may be used in adhesion of members to one another, each of which comprises both of area of light transmittance with the wavelength of 350 to 450 nm of less than 0.1% and area of light transmittance with the wavelength of 350 to 450 nm of 50% or larger. The area of light transmittance with the wavelength of 350 to 450 nm of less than 0.1% includes a specific printed pattern provided on plate glass products in view of designing aspect. Patterning for display screen image of a mobile phone as shown by printed pattern 1 in FIG. 1 may be exemplified as the printed pattern. The area of light transmittance with the wavelength of 350 to 450 nm of 50% or larger includes an area in which a specific printed pattern provided on plate glass product. A surface of the plate glass as shown by a plate glass surface 2 in FIG. 1 may be exemplified as such area in which a specific printed pattern provided on plate glass product. The light transmittance with the wavelength of 350 to 450 nm may be measured by spectrophotometer such as UV-2550 model manufactured by Shimadzu Corporation. In such case, air is employed as a blank.

Embodiment for use of the invention includes using the composition as adhesive composition. Among of the adhesive composition, the composition of the invention may be used as a two-component adhesive composition. As for the two-component system, all of the essential components of the adhesive composition of the invention are not mixed together in storage, but preferably stored in either of a first agent and second agent. In such case, both agents are applied on members at the same time or separately, and those members are brought into contact with each other to cure the composition, so that the composition of the invention may be used as two-component composition for temporarily fixing members. In case of using the composition of the invention as a two-component adhesive composition, it is preferable that the first agent contains at least (C) organic peroxide, and that the second agent contains at least (D) decomposition accelerator. (E) Polymerization initiator and (F) organic thermally expandable particles may be included in either or both of the first agent and the second agent. In the invention, the composition may be cured only by mixing the two components.

Another embodiment includes a method comprising mixing the first and the second agents, applying the resulting mixture on a member, in which (E) polymerization initiator is included in either or both of the first and second agents, and irradiating the member with visible light ray or ultraviolet ray to cure the composition, to thereby temporarily fix the member on the other member. Further embodiment includes a method comprising applying the first agent on the first member, and the second agent on the second member, respectively, sticking the resulting first and second members together, and irradiating those members with visible light ray or ultraviolet ray to cure the composition, to thereby temporarily fix the member on the other member.

A method for use of the adhesive composition for temporarily fixing of the invention includes a method comprising applying the adhesive in adequate amount on bonded area of one of members to be fixed, and sticking the other member together; and a method comprising preliminarily layering many members to be fixed, applying the adhesive in such a manner that the adhesive is allowed to permeate in clearance gap to thereby be applied therein, curing the adhesive composition for temporarily fixing, to thereby temporarily fix the member on the other member.

As for the adhesive composition for temporarily fixing of the invention, two agents are not necessarily balanced precisely for curing at ordinary temperature. When balancing inaccurately is made, the adhesive may be cured at ordinary temperature by mixing, or even contacting those two agents. Therefore, the adhesive composition for temporarily fixing of the invention should be excellent in workability.

When both of the agents are simultaneously or separately applied to member to be brought into contact and cured, to thereby fix temporarily members to one another, it is preferable to bond members by applying a mixture of two of agents to the members and bringing them into contact, thereby allowing them for 0.5 to 500 hours at ordinary temperature. When allowing for 0.5 hour or more, the composition should be cured to thereby obtain sufficient adhesive strength. When allowing for 500 hours or less, sufficient adhesive properties are obtained. The period for allowing members to temporarily fix is preferably 4 to 300 hours, more preferably 24 to 200 hours, and most preferably 50 to 100 hours. The ordinary temperature is, for example, 10 to 40 degrees C.

When irradiating with visible light or ultraviolet light to cure the composition to thereby fix temporarily members to one another, it is preferable to bond the adherend substrate by irradiating with energy of 1 to 10000 mJ/cm$^2$ at wavelength of 365 nm to the composition. When irradiating with the energy of 1 to 10000 mJ/cm$^2$, the composition should be cured to thereby obtain sufficient adhesive strength. When irradiating with the energy of 1 mJ/cm$^2$ or more, the composition should be sufficiently cured. When irradiating with the energy of 10000 mJ/cm$^2$ or less, there should be little curing strain, so that the adhesive strength should be improved. The amount of energy at temporarily fixing members to one another is preferably 10 to 5000 mJ/cm$^2$, and most preferably 100 to 3000 mJ/cm$^2$ in view of the adhesive strength.

In a method for temporarily fixing by use of the composition of the invention, by immersing a bonded article in water of preferably 0 to 100 degrees C. after above mentioned temporarily fixing by irradiating with light energy, water enters interfacially between a cured body (adherend substrate) and the composition, so that it is more easily to peel the cure body. The higher is the temperature of the water, the more widely is occurred swell by curing stain generated in the cured body, the more easily does water enter therebetween, so that cured body could be easily peeled. The temperature of water at releasing the cured body is preferably 30 to 95 degrees C., and most preferably 45 to 90 degrees C. in view of peeling property and degradation of the adherend substrate by hot water. The period for immersing is preferably 1 to 120 minutes, more preferably 2 to 60 minutes, and most preferably 5 to 20 minutes.

For releasing the cured body of the composition, by irradiating with visible light or ultraviolet light, preferably the energy of 40000 mJ/cm$^2$ or less at wavelength of 365 nm, radical is generated from the unreacted component (E), to thereby generate a lot of curing stain, to thereby occur swell widely in the cured body itself, so that the adhesion area is reduced, and the adhesive strength decreases, so that the cured body may easily be released. The amount of the energy at releasing the cured body is more preferably 500 to 20000 mJ/cm$^2$, and most preferably 1000 to 10000 mJ/cm$^2$ in view of peeling property and degradation of the cured body by the light energy.

The source of the energy at releasing the cured body of the composition includes deuterium lamp, high-pressure mercury lamp, extra high pressure mercury lamp, low-pressure mercury lamp, xenon lamp, xenon-mercury mixture lamp, halogen lamp, excimer lamp, indium lamp, thallium lamp, LED lamp and electrodeless discharge lamp.

In a method for temporarily fixing by use of the composition of the invention, a bonded layered article is obtained by bonding and layering 2 to 100 pieces of members, and thereafter the bonded layered article is immersed in water of 0 to 100 degrees C. to release member from layered article of adhesive composition.

Layering may be performed in a manner that, after sticking the members, in one of which or both of which the adhesive composition is applied to on the surface to be stuck, light is irradiated with in order to cure the adhesive composition as sandwiched and spread between both members. By repeating this procedure for the intended times, layered article may be produced in which the intended number of members are layered. Irradiating light may be performed at every time for layering one member, or after layering plural members as long as the light could reach the adhesive composition. Members may have both of area of light transmittance with the wavelength of 350 to 450 nm of less than 0.1% and area of the light transmittance of 50% or larger, and such members may be bonded together. Further, areas of the member of the light transmittance of less than 0.1% may be overlapped.

Temporarily fixed members is subjected to a process such as cutting, grinding, polishing and punching, and thereafter the members are immersed in water, preferably hot water, so that the cured body of the composition may be released from the members.

EXAMPLES

The present invention will be further illustrated referring to the following examples and comparative examples. However, the present invention should not be limited to those examples.

Example 1

Preparation of Adhesive Composition

The materials to be used are shown in Table 1. Each of the materials was mixed in a respect amount as shown in Table 2, a two-component adhesive composition for temporarily fixing comprising a first and a second agents was prepared (two-component can be called as two-liquid). Using the resulting adhesive composition, a glass transition temperature measurement, tensile shear adhesive strength, adhesion/peeling test (A) to (F), layer adhesion/peeling test were conducted in accordance with the following evaluation method. The results are shown in Tables 3 to 5. The name of the composition of Table 2 is represented by each abbreviation as shown in Table 1. The accumulated light amount was measured by a cumulative UV irradiation intensity tester (EYE UVMETER UVPF-A1 (with a beam sensor of 365 nm) manufactured by Eye Graphics Co. Ltd.).

(Evaluation Method)

A glass transition temperature of a cured body of adhesive agent by UV curing ("2 Liquid+UV" in Table): An adhesive composition as obtained by mixing the first and the second agents in equal amount was sandwiched by PET films in use of a mold form of a silicon sheet of 1 mm thick. The adhesive composition was cured by irradiating with the light of 365 nm in wavelength and accumulated light amount of 2000 mJ/cm$^2$ from the upper surface by use of a metal halide lamp in conveyor belt style. Thereafter, the composition was further cured by irradiating with the light of 365 nm in wavelength and accumulated light amount of 2000 mJ/cm$^2$ from the lower surface, to thereby obtain a cured body of the adhesive composition of 1 mm thick. The resulting cured body was cut into 50 mm in length×5 mm in width by a cutter, to thereby obtain a cured body for measuring the glass transition temperature. A stress and a strain in a tensile direction of 1 Hz was applied to the resulting cured body under nitrogen atmosphere by use of a Dynamic Viscoelastic Measuring apparatus "DMS210" manufactured by Seiko Denshi Sangyo, and tan δ was measured with increasing the temperature in a rate of 2 degrees C. per minute, and the temperature at the peak top of tan δ determined as the glass transition temperature of the cured body by UV irradiation.

A glass transition temperature of a cured body of adhesive agent by redox curing ("2 Liquid after 24 hours" in Table): An adhesive composition as obtained by mixing the first and the second agents in equal amount was sandwiched by PET films in use of a mold form of a silicon sheet of 1 mm thick. The adhesive composition was sealed at 23 degrees C. for 24 hours, to thereby obtain a cured body of the adhesive composition of 1 mm thick. The resulting cured body was cut into 50 mm in length×5 mm in width by a cutter, to thereby obtain a cured body for measuring the glass transition temperature. A stress and a strain in a tensile direction of 1 Hz was applied to the resulting cured body under nitrogen atmosphere by use of a Dynamic Viscoelastic Measuring apparatus "DMS210" manufactured by Seiko Denshi Sangyo, and tan δ was measured with increasing the temperature in a rate of 2 degrees C. per minute, and the temperature at the peak top of tan δ determined as the glass transition temperature of the cured body by mixing two-component.

Tensile shear adhesive strength by UV curing ("adhesive strength (UV curing)" in Table): It was measured in accordance with JIS K 6850. Heat resistance glasses (trade name "Heat resistant Pyrex™ glass", 25 mm in length×25 mm in width×2.0 mm in thickness) was used as an adherend, and those two heat resistance glasses was bonded by an adhesive composition obtained by mixing the first and the second agents in equal amount at a bonding area of a circle of 8 mm in diameter. Thereafter, the adhesive composition was cured by irradiating with the light of 365 nm in wavelength and accumulated light amount of 2000 mJ/cm$^2$ from the upper surface by use of a metal halide lamp in conveyor belt style, to thereby obtain a test piece for measuring tensile shear adhesive strength. The resulting test piece was subjected to measurement of tensile shear adhesive strength under the condition of 23 degrees C. of temperature, 50% of humidity and 10 mm/min of tension rate by use of a universal tester.

Tensile shear adhesive strength by redox curing ("adhesive strength (2 Liquid curing)" in Table): It was measured in accordance with JIS K 6850. Specifically, heat resistance glasses (trade name "Heat resistant Pyrex™ glass", 25 mm in length×25 mm in width×2.0 mm in thickness) was used as an adherend, and those two heat resistance glasses was bonded by an adhesive composition obtained by mixing the first and the second agents in equal amount at a bonding area of a circle of 8 mm in diameter. Thereafter, the adhesive composition was sealed at 23 degrees C. for 24 hours, to thereby obtain a test piece for measuring tensile shear adhesive strength. The resulting test piece was subjected to measurement of tensile shear adhesive strength under the condition of 23 degrees C. of temperature, 50% of humidity and 10 mm/min of tension rate by use of a universal tester.

Working life by redox curing ("Working life (2 Liquid curing)" in Table): The first and the second agents were mixed in equal amount of 5 g to each other at 23 degrees C. and 50% of humidity to thereby obtain a mixture. Thermocouple was stuck into the mixture, to thereby obtain an exotherm curve for the curing reaction. The working life was obtained based on the intersection of the tangent line and base line both of the exotherm curve. That is, the working life represents the period from obtaining the mixture to achieving the peak of the exotherm curve.

(Adhesion/Peeling Test (A))

An adhesive composition obtained by mixing the first and the second agents in equal amount was applied in the amount of 2.5 g on a blue plate glass A (150 mm in length×150 mm in width×1.7 mm in thickness) as an adherend substrate, to stick a blue plate glass B (80 mm in length×80 mm in width×1.1 mm in thickness) together on the blue plate glass A. Thereafter, the adhesive composition was cured by irradiating with the light of 365 nm in wavelength and accumulated light amount of 2000 mJ/cm$^2$ from the upper surface of the blue plate glass B by use of a metal halide lamp in conveyor belt style, to thereby bond the blue plate glasses together (UV irradiation for fixing). After checking that the bonded specimens were completely bonded, a light of 365 nm in wavelength and 2000 mJ/cm$^2$ in the accumulated light amount was irradiated twice (light amount of 4000 mJ/cm$^2$ in total) on the adhesive composition in the bonded specimens by use of a metal halide lamp in conveyor belt style (UV irradiation for peeling). Thereafter, the resulting specimens were immersed in hot water (90 degrees C.). The time in which the blue plate glasses were peeling from each other was determined, and the condition of the peeled films were observed. Here, peeling time means a time from immersing the specimen in hot water to peeling of members.

(Adhesion/Peeling Test (B))

An adhesive composition obtained by mixing the first and the second agents in equal amount was applied in the amount of 2.5 g on a blue plate glass A (150 mm in length×150 mm in width×1.7 mm in thickness) as an adherend substrate, to stick a blue plate glass B (80 mm in length×80 mm in width×1.1 mm in thickness) together on the blue plate glass A. Thereafter, the adhesive composition was cured by irradiating with the light of 365 nm in wavelength and accumulated light amount of 2000 mJ/cm$^2$ from the upper surface of the blue plate glass B by use of a metal halide lamp in conveyor belt style, to thereby bond the blue plate glasses together (UV irradiation for fixing). After sealing the resulting bonded specimen at 23 degrees C. for 24 hours to allow to be cured and checking that the bonded specimens were completely bonded, a light of 365 nm in wavelength and 2000 mJ/cm$^2$ in the accumulated light amount was irradiated eight times (light amount of 16000 mJ/cm$^2$ in total) on the adhesive composition in the bonded specimens by use of a metal halide lamp in conveyor belt style (UV irradiation for peeling). Thereafter, the resulting specimens were immersed in hot water (90 degrees C.). The time in which the blue plate glasses were peeling from each other was determined, and the condition of the peeled films were observed.

(Adhesion/Peeling Test (C))

An adhesive composition obtained by mixing the first and the second agents in equal amount was applied in the amount of 2.5 g on a blue plate glass A (150 mm in length×150 mm in width×1.7 mm in thickness) as an adherend substrate, to stick a blue plate glass B (80 mm in length×80 mm in width×1.1 mm in thickness) together on the blue plate glass A. After sealing the resulting bonded specimen at 23 degrees C. for 24 hours to allow to be cured and checking that the bonded specimens were completely bonded, the resulting specimens were immersed in hot water (90 degrees C.). The time in which the blue plate glasses were peeling from each other was determined, and the condition of the peeled films were observed.

(Adhesion/Peeling Test (D))

An adhesive composition obtained by mixing the first and the second agents in equal amount was applied in the amount of 2.5 g on a blue plate glass A (150 mm in length×150 mm in width×1.7 mm in thickness) as an adherend substrate, to stick a blue plate glass B (80 mm in length×80 mm in width×1.1 mm in thickness) together on the blue plate glass A. Thereafter, the adhesive composition was cured by irradiating with the light of 365 nm in wavelength and accumulated light amount of 2000 mJ/cm$^2$ from the upper surface of the blue plate glass B by use of a metal halide lamp in conveyor belt style, to thereby bond the blue plate glasses together (UV irradiation for fixing). After sealing the resulting bonded specimen at 23 degrees C. for 24 hours to allow to be cured, it was checked that the bonded specimens were completely bonded. Thereafter, the resulting specimens were immersed in hot water (90 degrees C.). The time in which the blue plate glasses were peeling from each other was determined, and the condition of the peeled films were observed.

(Adhesion/Peeling Test (E))

Figure 2:
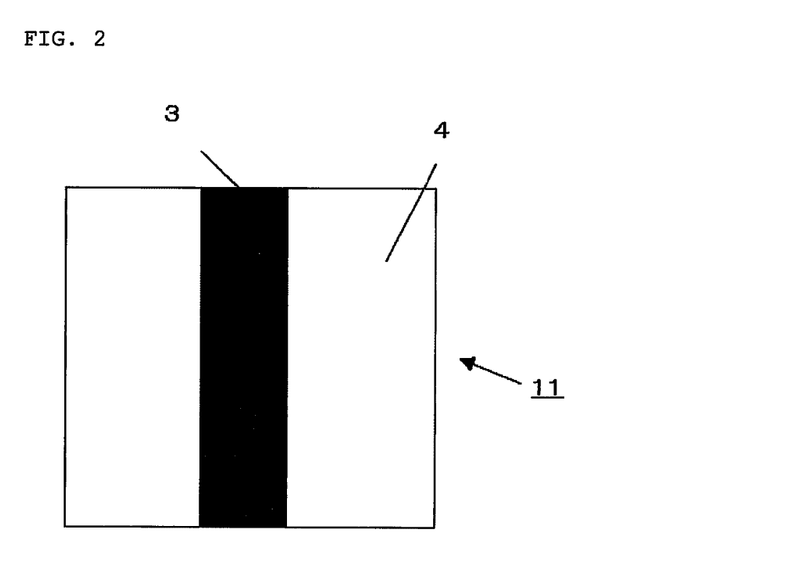
FIG. 2 shows an embodiment of a glass applied with a black ink.

The black ink was applied on the center of blue plate glass (80 mm in length×80 mm in width×1.1 mm in thickness) as an adherend substrate, so that two of black ink applied glasses 11 were prepared, each of which contains UV opaque area 3 of the size of 80 mm in length×80 mm in width×10 μm in thickness and blue plate glass surface 4 (as shown in FIG. 2; two of black ink applied glasses may be indicated as 11A and 11B, respectively). The light transmittance for 350 to 450 nm was measured for UV opaque area or UV transmission area 1 nm by 1 nm. Then, the average value was taken as the light transmittance for 350 to 450 nm of UV opaque area or UV transmission area. In the measurement, air was employed as a blank. As a result of the measurement, it was found that the light transmittance for 350 to 450 nm of UV opaque area is 0.0%, and on other hand that of UV transmission area was 91%. The black ink applied glasses 11 is an adherend substrate having a decorative printed area of 18 mm. The blue plate glass A (80 mm in length×80 mm in width×1.1 mm in thickness) and the blue plate glass B (80 mm in length×80 mm in width×1.1 mm in thickness) of adhesion/peeling test (E) correspond thereto. An adhesive composition obtained by mixing the first and the second agents in equal amount was applied in the amount of 2.5 g on a blue plate glass A having 18 mm of decorative printed area to stick the blue plate glass B having 18 mm of decorative printed area (80 mm in length× 80 mm in width×1.1 mm in thickness) together, so that the black ink applied areas of both of the glass were laid over each other. Then, the adhesive composition was cured by irradiating with the light of 365 nm in wavelength and accumulated light amount of 50 mJ/cm$^2$ from the upper surface of the blue plate glass B by use of a metal halide lamp in conveyor belt style, to thereby bond the blue plate glasses together (UV irradiation for fixing). After sealing the resulting bonded specimen at 23 degrees C. for 24 hours to allow to be cured and checking that the bonded specimens were completely bonded, a light of 365 nm in wavelength and 2000 mJ/cm$^2$ in the accumulated light amount was irradiated eight times (light amount of 16000 mJ/cm$^2$ in total) on the adhesive composition in the bonded specimens by use of a metal halide lamp in conveyor belt style (UV irradiation for peeling). Thereafter, the resulting specimens were immersed in hot water (90 degrees C.). The time in which the blue plate glasses were peeling from each other was determined, and the condition of the peeled films were observed.

(Adhesion/Peeling Test (F))

An adhesive composition obtained by mixing the first and the second agents in equal amount was applied in the amount of 2.5 g on a blue plate glass A having 18 mm of decorative printed area (black ink applied glass 11, 80 mm in length×80 mm in width×1.1 mm in thickness) to stick the blue plate glass B having 18 mm of decorative printed area (black ink applied glass 11, 80 mm in length×80 mm in width×1.1 mm in thickness) together, so that the black ink applied areas of both of the glass were laid over each other. Then, the adhesive composition was cured by irradiating with the light of 365 nm in wavelength and accumulated light amount of 50 mJ/cm$^2$ from the upper surface of the blue plate glass B by use of a metal halide lamp in conveyor belt style, to thereby bond the blue plate glasses together (UV irradiation for fixing). After sealing the resulting bonded specimen at 23 degrees C. for 24 hours to allow to be cured and checking that the bonded specimens were completely bonded, a light of 365 nm in wavelength and 2000 mJ/cm$^2$ in the accumulated light amount was irradiated eight times (light amount of 16000 mJ/cm$^2$ in total) on the adhesive composition in the bonded specimens by use of a metal halide lamp in conveyor belt style (UV irradiation for peeling). Thereafter, the resulting specimens were immersed in hot water (90 degrees C.). The time in which the blue plate glasses were peeling from each other was determined, and the condition of the peeled films were observed.

(Adhesion/Peeling Test (G))

An adhesive composition obtained by mixing the first and the second agents in equal amount was applied in the amount of 2.5 g on a blue plate glass A having 18 mm of decorative printed area (black ink applied glass 11, 80 mm in length×80 mm in width×1.1 mm in thickness) to stick the blue plate glass B having 18 mm of decorative printed area (black ink applied glass 11, 80 mm in length×80 mm in width×1.1 mm in thickness) together, so that the black ink applied areas of both of the glass were laid over each other. Then, the adhesive composition was cured by irradiating with the light of 365 nm in wavelength and accumulated light amount of 50 mJ/cm$^2$ from the upper surface of the blue plate glass B by use of a metal halide lamp in conveyor belt style, to thereby bond the blue plate glasses together (UV irradiation for fixing). After sealing the resulting bonded specimen at 23 degrees C. for 24 hours to allow to be cured and checking that the bonded specimens were completely bonded, a light of 365 nm in wavelength and 2000 mJ/cm$^2$ in the accumulated light amount was irradiated eight times (light amount of 16000 mJ/cm$^2$ in total) on the adhesive composition in the bonded specimens by use of a metal halide lamp in conveyor belt style (UV irradiation for peeling). Thereafter, the resulting specimens were immersed in hot water (80 degrees C.). The time in which the blue plate glasses were peeling from each other was determined, and the condition of the peeled films were observed.

(Bonding and Layering/Processing/Peeling Test)

1. Preparation of a plate glass layered article

Figure 3:
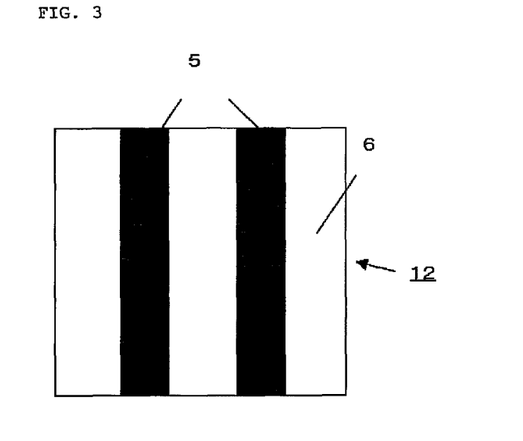
FIG. 3 shows another embodiment of a glass applied with a black ink.

The black ink was applied on a plate glass (530 mm in length×420 mm in width×0.7 mm in thickness) as an adherend substrate, in the surface area at 180 mm from the edge and another surface area at 360 mm from the edge, respectively, so that 12 pieces of black ink applied glasses 12, each having two of UV opaque areas 5 of the size of 530 mm in length×35 mm in width×10 μm in thickness and blue plate glass surface 6 (as shown in FIG. 3), were prepared. The black ink was applied in a manner that the middle of width of the UV opaque areas were located at the positions of 180 mm from the edge and another surface area at 360 mm from the edge, respectively. Twelve of the black ink applied glasses 12 was stuck together interposing an adhesive composition obtained by mixing the first and the second agents in equal amount therebetween, to thereby obtain a plate glass layered article. Specifically, four grams of the adhesive composition was applied on the entire surface of the adherend substrate (that is, a first black ink applied glasses 12), so that a second black ink applied glass 12 was stuck to the first black ink applied glass 12 in a manner that the black ink applied areas of both of the glass were laid over each other. The UV irradiation was conducted from the lower area of the first black ink applied glasses 12, to cure the adhesive composition. The light of 365 nm in wavelength and UV irradiation amount of 50 mJ/cm$^2$ was employed (UV irradiation for fixing). After UV irradiation for fixing was conducted, by repeating the procedure promptly and without sealing, a plate glass layered article comprising 12 of plate glasses was obtained. The light transmittance with the wavelength of 350 to 450 nm may be measured by spectrophotometer (UV-2550 model manufactured by Shimadzu Corporation). The light transmittance for 350 to 450 nm was measured for UV opaque area or UV transmission area 1 nm by 1 nm. Then, the average value was taken as the light transmittance from 350 to 450 nm of UV opaque area or UV transmission area. In the measurement, air was employed as a blank. As a result of the measurement, it was found that the light transmittance for 350 to 450 nm of UV opaque area is 0.0%, and on other hand that of UV transmission area was 91%.

2. Cutting processing of plate glass layered article

After fixing the plate glass layered article to the cradle, the article was cut in thickness direction along with provided cutting line by a disc cutter, so that divided plate glass layered articles were obtained. In this case, each of the plate glasses were divided in a size of 100 mm in width×50 mm in length×0.7 mm in thickness.

3. Processing for outer shape of the plate glass layered articles

The divided plate glass layered articles were fixed on the cradle. The plate glass layered articles fixed on the cradle were subjected to processing for outer shape by grinding with a grindstone.

4. After sealing the resulting plate glass layered articles at 23 degrees C. for 24 hours to allow to be cured and checking that the plate glass layered articles were completely bonded, a light of 365 nm in wavelength and 2000 mJ/cm$^2$ in the accumulated light amount was irradiated eight times (light amount of 16000 mJ/cm$^2$ in total) on the adhesive composition in the bonded specimens by use of a metal halide lamp in conveyor belt style (UV irradiation for peeling). Thereafter, the resulting specimens were immersed in hot water (90 degrees C.). The time in which the blue plate glasses were peeling from each other was determined, and the condition of the peeled films were observed.

TABLE 1

| Trade name | Chemicals | Manufacturer |
| --- | --- | --- |
| TE-2000 | 1,2-Polybutadiene-terminated urethane acrylate (Weight-Average Molecular Weight 9000) | Nippon Soda Co., Ltd. |
| UV-3000B | Polyester type urethane acrylate (Weight-Average Molecular Weight 18000; Polyol compound: polyester polyol; Organic polyisocyanate: isophorone diisocyanate; Hydroxy (meth)acrylate: 2-hydroxyethyl acrylate) | Nippon Synthetic Chemical Industry Co., Ltd. |

TABLE 1-continued

| Trade name | Chemicals | Manufacturer |
|---|---|---|
| 1.6-HX-A | 1,6-Hexanediol diacrylate | Kyoeisha Chemical Co., Ltd. |
| R-684 | Dicyclopentanyl diacrylate | Nippon Kayaku Co., Ltd. |
| APG-200 | Tripropylene glycol diacrylate | Shin-nakamura Chemical Co., Ltd. |
| M-101A | 2-Mol phenolethylene oxide modified acrylate | Toagosei Co., Ltd. |
| M-140 | 2-(1,2-Cyclohexadicarboxyimide)ethylacrylate | Toagosei Co., Ltd. |
| M-5700 | 2-Hydroxy-3-phenoxypropylacrylate | Toagosei Co., Ltd. |
| Percumyl ND | Cumyl peroxyneodecanoate | NOF Corporation |
| Percumyl H | Cumene hydroperoxide | NOF Corporation |
| Oct-co | Cobalt octylate | SHINTO PAINT CO., Ltd. |
| TU-2 | Ethylene thiourea | Kawaguchi Chemical Industry Co., LTD. |
| I-754 | Oxy-phenyl-acetic acid ester | BASF Japan Ltd. |
| BDK | Benzyl dimethyl ketal | BASF Japan Ltd. |
| In-D | 2,2'-methylene-bis (4-methyl-6-t-butyl phenol) | Sumitomo Chemical Co., Ltd. |
| CIT | Cirtric acid | Pfizer Japan Inc. |
| F-36D | Thermo-expandable microcapsul Particle size: 5-15 μm; foam initiating temperature: 75-85 degrees C. | Matsumoto Yushi-Seiyaku Co., Ltd. |
| F-46 | Thermo-expandable microcapsule Particle size: 8-14 μm; foam initiating temperature: 90-100 degrees C. | Matsumoto Yushi-Seiyaku Co., Ltd. |
| GS-100S | Crosslinked polystyrene spacer filler, Particle size: 100 μm, Standard deviation of particle volumetric distribution to particle size: 0.063 | AICA Inc. |
| GS-75S | Crosslinked polystyrene spacer filler, Particle size: 75 μm, Standard deviation of particle volumetric distribution to particle size: 0.066 | AICA Inc. |

TABLE 2

| Example No. | | First agent | Second agent |
|---|---|---|---|
| (A) Component (parts by mass) | TE-2000 | — | — |
| | UV-3000B | 20 | 20 |
| | 1.6-HX-A | — | — |
| | R-684 | — | — |
| | APG-200 | 15 | 15 |
| (B) Component (parts by mass) | M-101A | 25 | 25 |
| | M-140 | 40 | 40 |
| | M-5700 | — | — |
| (C) Component (parts by mass) | Percumyl ND | — | — |
| | Percumyl H | 3 | — |
| (D) Component (parts by mass) | Oct-co | — | 3 |
| | TU-2 | — | — |
| (E) Component (parts by mass) | I-754 | — | — |
| | BDK | 1.5 | 1.5 |
| Polymerization inhibitor (parts by mass) | In-D | 0.1 | 0.1 |
| | CIT | 0.1 | 0.1 |
| (F) Component (parts by mass) | F-36D | 10 | 10 |
| | F-46 | — | — |
| (G) Component (parts by mass) | GS-100S | 0.3 | 0.3 |
| | GS-75S | — | — |

TABLE 3

| | Example No. | Example 1 |
|---|---|---|
| Glass transition temperature (degree C.) | 2 Liquid + UV | 16 |
| Glass transition temperature (degree C.) | 2 Liquid after 24 Hours | 16 |
| Adhesive strength (UV irradiation) | UV irradiation amount (mJ/cm$^2$) | 2000 |
| | Adhesive strength (MPa) | 8.5 |
| Adhesive strength (2 Liquid curing) | Bonding Temperature (degree C.) | 23 |
| | Sealing time after bonding (hours) | 24 |
| | Adhesive strength (MPa) | 8.1 |
| Working life (2 Liquid curing) | Working life (min) | 5 |

TABLE 4

| Example No. | | Example 1 |
|---|---|---|
| Adhesion/peeling test (A) | Accumulated irradiation amount at UV irradiation for fixing (mJ/cm$^2$) | 2000 |
| | Accumulated irradiation amount at UV irradiation for peeling (mJ/cm$^2$) | 4000 |
| | Sealing time after UV irradiation for fixing (hour) | 0 |
| | Temperature of hot water (degree C.) | 90 |
| | Peeling time in hot water (min) | 20 |
| | Condition at peeling | Film |
| Adhesion/peeling test (B) | Accumulated irradiation amount at UV irradiation for fixing (mJ/cm$^2$) | 2000 |
| | Accumulated irradiation amount at UV irradiation for peeling (mJ/cm$^2$) | 16000 |
| | Sealing time after UV irradiation for fixing (hour) | 24 |
| | Temperature of hot water (degree C.) | 90 |
| | Peeling time in hot water (min) | 5 |
| | Condition at peeling | Film |
| Adhesion/peeling test (C) | Accumulated irradiation amount at UV irradiation for fixing (mJ/cm$^2$) | 0 |
| | Accumulated irradiation amount at UV irradiation for peeling (mJ/cm$^2$) | 0 |
| | Sealing time after bonding (hour) | 24 |
| | Temperature of hot water (degree C.) | 90 |
| | Peeling time in hot water (min) | 30 |
| | Condition at peeling | Film |

TABLE 4-continued

| | Example No. | Example 1 |
|---|---|---|
| Adhesion/peeling test (D) | Accumulated irradiation amount at UV irradiation for fixing (mJ/cm²) | 2000 |
| | Accumulated irradiation amount at UV irradiation for peeling (mJ/cm²) | 0 |
| | Sealing time after UV irradiation for fixing (hour) | 24 |
| | Temperature of hot water (degree C.) | 90 |
| | Peeling time in hot water (min) | 20 |
| | Condition at peeling | Film |

TABLE 5

| | Example No. | Example 1 |
|---|---|---|
| Adhesion/peeling test (E) | Temperature at sealing for fixing (degree C.) | 50 |
| | Accumulated irradiation amount at UV irradiation for peeling (mJ/cm²) | 16000 |
| | Sealing time after UV irradiation for fixing (hour) | 4 |
| | Temperature of hot water (degree C.) | 90 |
| | Peeling time in hot water (min) | 5 |
| | Condition at peeling | Film |
| Adhesion/peeling test (F) | Accumulated irradiation amount at UV irradiation for fixing (mJ/cm²) | 50 |
| | Accumulated irradiation amount at UV irradiation for peeling (mJ/cm²) | 16000 |
| | Sealing time after UV irradiation for fixing (hour) | 24 |
| | Temperature of hot water (degree C.) | 90 |
| | Peeling time in hot water (min) | 1 |
| | Condition at peeling | Film |
| Adhesion/peeling test (G) | Accumulated irradiation amount at UV irradiation for fixing (mJ/cm²) | 50 |
| | Accumulated irradiation amount at UV irradiation for peeling (mJ/cm²) | 16000 |
| | Sealing time after UV irradiation for fixing (hour) | 24 |
| | Temperature of hot water (degree C.) | 80 |
| | Peeling time in hot water (min) | 20 |
| | Condition at peeling | Film |
| Bonding and layering/processing/peeling test | Number of layered glasses (pieces) | 12 |
| | Temperature of hot water (degree C.) | 90 |
| | Time requied for peeling whole 12 pieces (min) | 20 |
| | Condition at peeling | Film |

Examples 2 to 9

The resin compositions were prepared in the same manner of Example 1 except that materials of Table 6 were employed in a specific content as shown in Table 6. The resulting adhesive compositions were subjected to measuring the glass transition temperature and tensile shear adhesive strength in the same manner of Example 1. The results are shown in Table 7.

TABLE 6

| | Example No. | Example 2 | | Example 3 | | Example 4 | | Example 5 | |
|---|---|---|---|---|---|---|---|---|---|
| | | First agent | Second agent | First agent | Second agent | First agent | Second agent | First agent | Second agent |
| (A) Component (parts by mass) | TE-2000 | — | — | — | — | — | — | 20 | 20 |
| | UV-3000B | 20 | 20 | 20 | 20 | 20 | 20 | — | — |
| | 1.6-HX-A | — | — | — | — | — | — | — | — |
| | R-684 | — | — | — | — | — | — | 5 | 5 |
| | APG-200 | 15 | 15 | 15 | 15 | 15 | 15 | — | — |
| (B) Component (parts by mass) | M-101A | 25 | 25 | 25 | 25 | 25 | 25 | 25 | 25 |
| | M-140 | 40 | 40 | 40 | 40 | 40 | 40 | 50 | 50 |
| | M-5700 | — | — | — | — | — | — | — | — |
| (C) Component (parts by mass) | Percumyl ND | — | — | — | — | 5 | — | — | — |
| | Percumyl H | 3 | — | 0.5 | — | — | — | 3 | — |
| (D) Component (parts by mass) | Oct-co | — | 3 | — | 1 | — | — | — | 3 |
| | TU-2 | — | — | — | — | — | 5 | — | — |
| (E) Component (parts by mass) | I-754 | — | — | — | — | — | — | — | — |
| | BDK | 5 | 5 | 20 | 20 | 1.5 | 1.5 | 1.5 | 1.5 |
| Polymerization inhibitor (parts by mass) | In-D | 0.1 | 0.1 | 0.1 | 0.1 | 0.1 | 0.1 | 0.1 | 0.1 |
| | CIT | 0.1 | | 0.1 | | 0.1 | | 0.1 | |
| (F) Component (parts by mass) | F-36D | 10 | 10 | — | — | — | — | 10 | 10 |
| | F-46 | — | — | — | — | 10 | 10 | — | — |
| (G) Component (parts by mass) | GS-100S | 0.3 | 0.3 | — | — | 0.3 | 0.3 | 0.3 | 0.3 |
| | GS-75S | — | — | 0.3 | 0.3 | — | — | — | — |

| | Example No. | Example 6 | | Example 7 | | Example 8 | | Example 9 | |
|---|---|---|---|---|---|---|---|---|---|
| | | First agent | Second agent | First agent | Second agent | First agent | Second agent | First agent | Second agent |
| (A) Component (parts by mass) | TE-2000 | — | — | — | — | — | — | — | — |
| | UV-3000B | 40 | 40 | 60 | 60 | 20 | 20 | 20 | 20 |
| | 1.6-HX-A | 25 | 25 | — | — | — | — | — | — |
| | R-684 | — | — | — | — | 15 | 15 | 15 | 15 |
| | APG-200 | — | — | 30 | 30 | — | — | — | — |
| (B) Component (parts by mass) | M-101A | 15 | 15 | 5 | 5 | 25 | 25 | 25 | 25 |
| | M-140 | — | — | 5 | 5 | — | — | — | — |
| | M-5700 | 20 | 20 | — | — | 40 | 40 | 40 | 40 |
| (C) Component (parts by mass) | Percumyl ND | — | — | — | — | — | — | — | — |
| | Percumyl H | 3 | — | 3 | — | 2 | — | 3 | — |

TABLE 6-continued

| | | | | | | | | | |
|---|---|---|---|---|---|---|---|---|---|
| (D) Component (parts by mass) | Oct-co | — | 3 | — | 3 | — | 2 | — | 3 |
| | TU-2 | — | — | — | — | — | — | — | — |
| (E) Component (parts by mass) | I-754 | 1.5 | 1.5 | — | — | — | — | — | — |
| | BDK | — | — | 1.5 | 1.5 | 10 | 10 | 10 | 10 |
| Polymerization inhibitor (parts by mass) | In-D | 0.1 | 0.1 | 0.1 | 0.1 | 0.2 | 0.2 | 0.2 | 0.2 |
| | CIT | 0.1 | — | 0.1 | — | 0.1 | — | 0.1 | — |
| (F) Component (parts by mass) | F-36D | 10 | 10 | 10 | 10 | — | — | — | — |
| | F-46 | — | — | — | — | — | — | — | — |
| (G) Component (parts by mass) | GS-100S | 0.3 | 0.3 | 2 | 2 | — | — | — | — |
| | GS-75S | — | — | — | — | 0.6 | 0.6 | 0.3 | 0.3 |

TABLE 7

| Example No. | | Example 2 | Example 3 | Example 4 | Example 5 | Example 6 | Example 7 | Example 8 | Example 9 |
|---|---|---|---|---|---|---|---|---|---|
| Glass transition temperature (degree C.) | 2 Liquid + UV | 10 | 8 | 16 | 14 | 32 | 40 | 21 | 21 |
| Glass transition temperature (degree C.) | 2 Liquid after 24 Hours | 16 | 11 | 16 | 14 | 32 | 40 | 14 | 15 |
| Adhesive strength (UV irradiation) | UV irradiation amount (mJ/cm²) | 2000 | 2000 | 2000 | 2000 | 2000 | 2000 | 2000 | 2000 |
| | Adhesive strength (MPa) | 8.9 | 9.5 | 8.5 | 10.5 | 5.3 | 4.2 | 9 | 9.1 |
| Adhesive strength (2 Liquid curing) | Bonding Temperature (degree C.) | 23 | 23 | 23 | 23 | 23 | 23 | 23 | 23 |
| | Sealing time after bonding (hours) | 24 | 24 | 24 | 24 | 24 | 24 | 24 | 24 |
| | Adhesive strength (MPa) | 8.1 | 4.8 | 8.1 | 10.3 | 5.3 | 4.1 | 8.4 | 8.2 |
| Working life (2 Liquid curing) | Working life (min) | 5 | 30 | 3 | 5 | 5 | 3 | 25 | 15 |

Comparative Examples 1 and 2

The resin compositions were prepared in the same manner of Example 1 except that materials of Table 8 were employed in a specific content as shown in Table 8. The resulting adhesive compositions were subjected to measuring the glass transition temperature, tensile shear adhesive strength, the adhesion/peeling test (F) and the bonding and layering/processing/peeling test in the same manner of Example 1. The results are shown in Table 9.

TABLE 8

| | | Comp. Example 1 | | Comp. Example 2 | |
|---|---|---|---|---|---|
| Example No. | | First agent | Second agent | First agent | Second agent |
| (A) Component (parts by mass) | TE-2000 | — | — | — | — |
| | UV-3000B | 20 | 20 | 20 | 20 |
| | 1.6-HX-A | — | — | — | — |
| | R-684 | — | — | — | — |
| | APG-200 | 15 | 15 | 15 | 15 |
| (B) Component (parts by mass) | M-101A | 25 | 25 | 25 | 25 |
| | M-140 | 40 | 40 | 40 | 40 |
| | M-5700 | — | — | — | — |
| (C) Component (parts by mass) | Percumyl ND | — | — | — | — |
| | Percumyl H | — | — | 3 | — |
| (D) Component (parts by mass) | Ocf-co | — | — | — | 3 |
| | TU-2 | — | — | — | — |
| (E) Component (parts by mass) | I-754 | — | — | — | — |
| | BDK | 1.5 | 1.5 | — | — |
| Polymerization inhibitor (parts by mass) | In-D | 0.1 | 0.1 | 0.1 | 0.1 |
| | CIT | 0.1 | — | 0.1 | — |
| (F) Component (parts by mass) | F-36D | 10 | 10 | — | — |
| | F-46 | — | — | — | — |
| (G) Component (parts by mass) | GS-100S | 0.3 | 0.3 | — | — |
| | GS-75S | — | — | — | — |

TABLE 9

| Example No. | | Comp. Example 1 | Comp. Example 2 |
|---|---|---|---|
| Glass transition temperature (degree C.) | 2 Liquid + UV | 20 | Could not be observed since not cured. |
| Glass transition temperature (degree C.) | 2 Liquid after 24 Hours | Could not be observed since not cured. | 18 |
| Adhesive strength (UV irradiation) | UV irradiation amount (mJ/cm²) | 2000 | 2000 |
| | Adhesive strength (MPa) | 9.1 | Could not be observed since not cured. |

TABLE 9-continued

| | Example No. | Comp. Example 1 | Comp. Example 2 |
|---|---|---|---|
| Adhesive strength (2 Liquid curing) | Bonding Temperature (degree C.) | 23 | 23 |
| | Sealing time after bonding (hours) | 24 | 24 |
| | Adhesive strength (MPa) | Could not be observed since not cured. | 8.3 |
| Working life (2 Liquid curing) | Working life (min) | Could not be observed since not cured. | 5 |
| Adhesion/peeling test (F) | Accumulated irradiation amount at UV irradiation for fixing (mJ/cm$^2$) | 2000 | 2000 |
| | Accumulated irradiation amount at UV irradiation for peeling (mJ/cm$^2$) | 16000 | 16000 |
| | Sealing time after UV irradiation for fixing (hour) | 24 | 24 |
| | Temperature of hot water (degree C.) | 90 | 90 |
| | Peeling time in hot water (min) | 10 | Not peeled |
| | Condition at peeling | Decorative Printed area was not cured. | Not peeled |
| Bonding and layering/processing/ peeling test | Number of layered glasses (pieces) | 12 | 12 |
| | Temperature of hot water (degree C.) | 90 | 90 |
| | Time requied for peeling whole 12 pieces (min) | 60 | Not peeled |
| | Condition at peeling | Decorative Printed area was not cured. | Not peeled |

Examples 10 to 18 and Comparative Example 3

A blue plate glass A of 80 mm in length×80 mm in width×1 mm in thickness and A blue plate glass B of 150 mm in length×150 mm in width×2 mm in thickness were stuck to each other with either of adhesive compositions of Examples or Comparative Example as shown in Table 10, either of which was obtained by mixing the first and the second agents in equal amount. Subsequently, the adhesive composition was cured by irradiating with the light of 365 nm in wavelength and accumulated light amount of 2000 mJ/cm$^2$ from the upper surface of the blue plate glass A by use of a metal halide lamp in conveyor belt style, to thereby bond the blue plate glasses together. The bonded specimen was cut only at the blue plate glass A portion into 10 mm square to thereby obtain a cut-off bonded specimen. In Examples, a dropout of the blue plate glass A did not take place during cutting, so that it exhibited excellent workability. Then, a light of 365 nm in wavelength and 2000 mJ/cm$^2$ in the accumulated light amount was irradiated five times (light amount of 10000 mJ/cm$^2$ in total) on the adhesive composition in the cut-off bonded specimens by use of a metal halide lamp in conveyor belt style (UV irradiation for peeling). Thereafter, the resulting cut-off bonded specimens were immersed in hot water at 90 degrees C., to peel the blue plate glass A and the blue plate glass B, so that the cut-off specimen was obtained. Ten pieces of the cut-off specimens were taken up in an offhand manner, and observed with an optical microscope on the back side, on which had been subjected to temporarily fixing by the adhesive composition, of each of the cut-off specimens. The maximum breadth of the points where the glass was dropped out was measured, and the average and the standard deviation was determined. The results are shown in Table 10.

TABLE 10

| test piece No. | Example of the resin composition | Maximum breadth of back side of each of 10 pieces of cut-off specimens (μm) | | | | | | | | | | Average (μm) | S.D.* |
|---|---|---|---|---|---|---|---|---|---|---|---|---|---|
| | | 1 | 2 | 3 | 4 | 5 | 6 | 7 | 8 | 9 | 10 | | |
| Example 10 | Resin composition of Example 1 and Adhesion/peeling test | 46 | 47 | 39 | 44 | 47 | 45 | 52 | 47 | 46 | 47 | 46 | 3.1 |
| Example 11 | Resin composition of Example 2 and Adhesion/peeling test | 77 | 67 | 36 | 67 | 62 | 72 | 57 | 69 | 57 | 76 | 64 | 11.4 |
| Example 12 | Resin composition of Example 3 and Adhesion/peeling test | 35 | 40 | 33 | 41 | 44 | 37 | 48 | 50 | 42 | 48 | 41.8 | 5.5 |
| Example 13 | Resin composition of Example 4 and Adhesion/peeling test | 65 | 69 | 73 | 75 | 36 | 77 | 40 | 56 | 73 | 71 | 63.5 | 14.0 |
| Example 14 | Resin composition of Example 5 and Adhesion/peeling test | 74 | 72 | 55 | 55 | 56 | 64 | 60 | 60 | 58 | 54 | 60.8 | 6.7 |
| Example 15 | Resin composition of Example 6 and Adhesion/peeling test | 53 | 56 | 56 | 56 | 58 | 61 | 62 | 66 | 52 | 51 | 57.1 | 4.5 |
| Example 16 | Resin composition of Example 7 and Adhesion/peeling test | 52 | 55 | 51 | 51 | 61 | 62 | 59 | 58 | 58 | 70 | 57.7 | 5.6 |

TABLE 10-continued

| test piece No. | Example of the resin composition | Maximum breadth of back side of each of 10 pieces of cut-off specimens (μm) | | | | | | | | | | Average (μm) | S.D.* |
|---|---|---|---|---|---|---|---|---|---|---|---|---|---|
| | | 1 | 2 | 3 | 4 | 5 | 6 | 7 | 8 | 9 | 10 | | |
| Example 17 | Resin composition of Example 8 and Adhesion/peeling test | 45 | 44 | 48 | 50 | 55 | 30 | 45 | 49 | 50 | 51 | 46.7 | 6.4 |
| Example 18 | Resin composition of Example 9 and Adhesion/peeling test | 47 | 48 | 52 | 53 | 54 | 55 | 56 | 57 | 45 | 40 | 50.7 | 5.2 |
| Comp. Example 3 | Resin composition of Comp. Example 2 and Adhesion/peeling test | Since the resin composition was not cured, so that the blue plate glass A and the blue plate glass B could not be bonded, the blue plate glass could not be cut | | | | | | | | | | | |

S.D*.: Standard Deviation

In accordance with Tables 1 to 10, it was found that the present invention exhibited excellent benefits. Since the composition of Comparative Example 1 did not contain (C) organic peroxide and (D) decomposition accelerator of organic peroxide, it did not exhibit benefits. Since the composition of Comparative Example 2 did not contain (E) polymerization initiator and (G) particulate matters, it did not exhibit benefits.

INDUSTRIAL APPLICABILITY

A composition of the present invention exhibits photo-curability, and is cured by visible light or ultraviolet light, because of its components. Therefore, the cured body thereof realizes high adhesive strength without being affected by the cutting water.

The composition of the present invention should be curable at ordinary temperature. Therefore, the cured body thereof realizes high adhesive strength without being affected by the cutting water.

For members which are partially opaque because of plating patterns and electric wiring formed thereon, the adhesive properties is sometimes insufficient merely by photocuring, so that there is provided a deviation between members when processing those members. Therefore, there is problem to be solved in view of the size precision. The present invention contains an organic peroxide, a decomposition accelerator, photopolymerization initiator and a specific (meth)acryl monomer together, so that the present invention does not cause a deviation when processing those members, even which is partially opaque, to improve the size precision and may easily provide excellent members.

The present invention shows decrease its adhesive strength by being brought contact with hot water, so that bonding strength between members or between member and jig decreases. Therefore, members may be easily recovered.

The present invention is suitable for an adhesive for temporarily fixing plate glass products on which a specified printed pattern, for example, patterning for display screen image of a mobile phone, is formed, and optical devices on which plating patterns are formed, and semiconductor packaging on which electric wiring is formed, so that the present invention should be industrially useful.

A method of the present invention does not need an organic solvent which is necessary in the conventional technique, and does not leaves any adhesive deposit on released members, and may easily provide members from the cured body, so that the present invention exhibits excellent workability.

EXPLANATIONS OF LETTERS OR NUMERALS

1 Printed pattern
2 Surface of plate glass
3,5 Surface of blue plate glass
10 Display screen image of a mobile phone
11,12 Black ink applied glasses Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A two-component composition for temporarily fixing members, comprising (A) a polyfunctional (meth)acrylate, (B) a mono-functional (meth)acrylate, (C) an organic peroxide, (D) a decomposition accelerator, (E) a polymerization initiator and (G) particulate matter, and composed of two-component system of a first agent and a second agent, said first agent containing at least said component (C) and said second agent containing at least said component (D), wherein cured body of said composition being used to bond members is brought into contact with water to be decomposed and release said members, and
  wherein the glass transition temperature of said cured body is from 0 to 45° C., and
  wherein the total amount of (A), (B), (C), and (D) is less than 90% by mass of the composition, and
  wherein the total amount of (A), (B), and (E) is less than 90% by mass of the composition.

2. The composition as claimed in claim 1, further comprising (F) organic thermally expandable particles.

3. The composition as claimed in claim 1, wherein said component (E) is one or two or more selected from a group consisting of benzyl dimethylketal, oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

4. The composition as claimed in claim 1, wherein said component (G) is one or two or more selected from a group consisting of cross-linked polymethyl(meth)acrylate particles, cross-linked polystyrene particles and cross-linked polymethyl(meth)acrylate/polystyrene copolymer particles.

5. The composition as claimed in claim 1, wherein the average size of said component (G) is 20 to 200 μm.

6. The composition as claimed in claim 1, wherein the standard deviation (σ) for logarithm of particle size (μm) of said component (G) is from 0.0001 to 0.25, wherein σ is expressed by the following formula:

$$\sigma = \sqrt{\left\{\frac{1}{100}\sum_{j=1}^{n} q_j\left(\frac{\log_{10}x_j + \log_{10}x_{j+1}}{2}\right)^2\right\} - \mu^2}$$

where
the average value of the particle size is $10^\mu$;

$$\mu = \frac{1}{100}\sum_{j=1}^{n} q_j \frac{\log_{10}x_j + \log_{10}x_{j+1}}{2};$$

$x_j$ is particle size (μm); and
$q_j$ is differential percentage of the relative amount of particles.

7. The composition as claimed in claim 1, wherein said component (G) has spherical shape.

8. The composition as claimed in claim 1, wherein said (A) a polyfunctional (meth)acrylate comprises polyfunctional (meth)acrylate oligomer/polymer, and/or polyfunctional (meth)acrylate monomer.

9. The composition as claimed in claim 8, wherein said polyfunctional (meth)acrylate oligomer/polymer comprises one or two or more selected from a group consisting of 1,2-polybutadiene-terminated urethane (meth)acrylate, polyester-based urethane (meth)acrylate, and polyether-based urethane (meth)acrylate.

10. The composition as claimed in claim 8, wherein said polyfunctional (meth)acrylate monomer comprises one or two or more selected from a group consisting of tripropylene glycol di(meth)acrylate, 1,9-nonanediol di(meth)acrylate, 1,6-hexanediol di(meth)acrylate, and dicyclopentanyl di(meth)acrylate.

11. The composition as claimed in claim 1, wherein said (B) a mono-functional (meth)acrylate comprises one or two or more selected from a group consisting of phenol (2-mol ethylene oxide modified) (meth)acrylate, 2-(1,2-cyclohexadicarboxyimide)ethyl(meth)acrylate and 2-hydroxy-3-phenoxypropyl(meth)acrylate.

12. The composition as claimed in claim 1, further comprising a polymerization inhibitor.

13. The composition as claimed in claim 1, being a curable resin.

14. The composition as claimed in claim 1, being photo-curable.

15. The composition as claimed in claim 1, being curable at ordinary temperature.

16. The composition as claimed in claim 1, being photo-curable and curable at ordinary temperature.

17. An adhesive composition, comprising the composition as claimed in claim 1.

18. The adhesive composition as claimed in claim 17, being used in adhesion of members to one another, each of which comprises both of area of light transmittance of less than 0.1% and area of light transmittance of 50% or larger.

19. The adhesive composition as claimed in claim 17, being used in adhesion of members to one another, each of which has light transmittance of less than 0.1%.

20. A structure obtained by bonding and fixing members to one another by the adhesive composition as claimed in claim 17.

21. A method for temporarily fixing members, comprising irradiating with visible light or ultraviolet light the adhesive composition as claimed in claim 17 to bond and fix temporarily members to one another, processing said temporarily fixed members, irradiating with visible light or ultraviolet light said adhesive composition, bringing cured body of said adhesive composition into contact with water to release said cured body from said members.

22. A method for temporarily fixing members, comprising irradiating with visible light or ultraviolet light the adhesive composition as claimed in claim 17 to bond members to one another, leaving them to be fixed temporarily, then processing said temporarily fixed members, bringing cured body of said adhesive composition into contact with water to release said cured body from said members.

23. A method for temporarily fixing members, comprising allowing the adhesive composition as claimed in claim 17 to bond and fix temporarily members to one another, processing said temporarily fixed members, bringing cured body of said adhesive composition into contact with water to release said cured body from said members.

24. The method for temporarily fixing members as claimed in claim 21, wherein said adhesive composition is obtained by preliminarily mixing the first agent and the second agent.

25. The method for temporarily fixing members as claimed in claim 21, wherein a bonded layered article is obtained by bonding and layering 2 to 100 pieces of members, and thereafter said bonded layered article is immersed in water to release said cured body of adhesive composition from said bonded layered article.

26. The method for temporarily fixing members as claimed in claim 21, wherein said member comprises both of area of light transmittance of less than 0.1% and area of light transmittance of 50% or larger.

27. The method for temporarily fixing members as claimed in claim 21, wherein said member has light transmittance of less than 0.1%.

* * * * *